United States Patent
Park et al.

(10) Patent No.: US 11,736,171 B2
(45) Date of Patent: *Aug. 22, 2023

(54) METHOD AND APPARATUS FOR TRANSMITTING AND RECEIVING UPLINK DATA IN WIRELESS COMMUNICATION SYSTEM

(71) Applicant: LG ELECTRONICS INC., Seoul (KR)

(72) Inventors: Haewook Park, Seoul (KR); Jiwon Kang, Seoul (KR); Jonghyun Park, Seoul (KR); Kijun Kim, Seoul (KR); Sukhyon Yoon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/881,186

(22) Filed: Aug. 4, 2022

(65) Prior Publication Data
US 2022/0393738 A1 Dec. 8, 2022

Related U.S. Application Data

(63) Continuation of application No. 17/669,895, filed on Feb. 11, 2022, now Pat. No. 11,451,282, which is a
(Continued)

(30) Foreign Application Priority Data

Feb. 14, 2019 (KR) .................. 10-2019-0017462

(51) Int. Cl.
*H04B 7/06* (2006.01)
*H04L 5/00* (2006.01)
(Continued)

(52) U.S. Cl.
CPC ......... *H04B 7/0626* (2013.01); *H04B 7/0456* (2013.01); *H04L 1/0026* (2013.01);
(Continued)

(58) Field of Classification Search
None
See application file for complete search history.

(56) References Cited

U.S. PATENT DOCUMENTS 8,948,115 B2 2/2015 Kim et al.
9,179,415 B2 11/2015 Kim et al.
(Continued)

FOREIGN PATENT DOCUMENTS

KR 1020180121563 11/2018

OTHER PUBLICATIONS

PCT International Search Report in International Appln. No. PCT/KR2020/002173, dated May 25, 2020, 6 pages (with English translation).
(Continued)

*Primary Examiner* — Ajit Patel
(74) *Attorney, Agent, or Firm* — Fish & Richardson P.C.

(57) ABSTRACT

Disclosed herein are a method and a device for transmitting a message in an initial access procedure by a user equipment (UE) in a wireless communication system. According to the present disclosure, a UE may transmit to a base station capability information associated with transmission power of the UE and the information may include a subset including at least one transmit precoding matrix indicator (TPMI) supported by the UE. The UE may receive first control information for transmitting a message associated with an initial access and the control information may include a TPMI used for the UE to transmit the message. Thereafter, the UE may transmit to the base station the message by using transmission power determined based on the TPMI and the
(Continued)

transmission power may be determined according to whether the TPMI is included in the at least one TPMI.

14 Claims, 23 Drawing Sheets

Related U.S. Application Data continuation of application No. 16/791,655, filed on Feb. 14, 2020, now Pat. No. 11,303,339.

(51) Int. Cl.
*H04L 1/00* (2006.01)
*H04L 1/06* (2006.01)
*H04W 24/10* (2009.01)
*H04B 7/0456* (2017.01)
*H04W 72/21* (2023.01)

(52) U.S. Cl.
CPC .......... *H04L 1/0681* (2013.01); *H04L 5/0057* (2013.01); *H04W 24/10* (2013.01); *H04W 72/21* (2023.01)

(56) References Cited

U.S. PATENT DOCUMENTS

| | | |
|---|---|---|
| 10,749,584 B2 | 8/2020 | Rahman et al. |
| 2012/0170525 A1 | 7/2012 | Sorrentino |
| 2017/0079064 A1 | 3/2017 | Yang et al. |
| 2018/0183503 A1* | 6/2018 | Rahman ................ H04W 72/23 |
| 2019/0081671 A1* | 3/2019 | Yang .................... H04B 7/0482 |
| 2019/0081835 A1 | 3/2019 | Yang et al. |
| 2019/0097710 A1* | 3/2019 | Park ....................... H04W 52/28 |
| 2019/0103907 A1 | 4/2019 | Yang et al. |
| 2019/0182001 A1* | 6/2019 | Lee ........................ H04W 72/21 |
| 2019/0312617 A1 | 10/2019 | Wernersson et al. |
| 2019/0327693 A1 | 10/2019 | Rahman et al. |
| 2020/0186215 A1 | 6/2020 | Rahman et al. |
| 2020/0267661 A1 | 8/2020 | Park et al. |

OTHER PUBLICATIONS

Samsung, "Codebook-based UL transmission," R1-1720282, 3GPP TSG RAN WG1 Meeting #91, Reno, USA, Nov. 27-Dec. 1, 2017, 16 pages.

* cited by examiner

METHOD AND APPARATUS FOR TRANSMITTING AND RECEIVING UPLINK DATA IN WIRELESS COMMUNICATION SYSTEM

CROSS-REFERENCE TO RELATED APPLICATIONS

This application is a continuation of U.S. application Ser. No. 17/669,895, filed on Feb. 11, 2022, which is a continuation of U.S. application Ser. No. 16/791,655, filed Feb. 14, 2020, (now U.S. Pat. No. 11,303,339) which claims the benefit of Korea Patent Application No. 10-2019-0017462, filed on Feb. 14, 2019. The disclosures of the prior applications are incorporated by reference in their entirety.

BACKGROUND OF THE INVENTION

Field of the Invention

The present disclosure relates to a wireless communication system, and more particularly, to a method for transmitting and receiving data in a wireless communication system and a device for supporting the same.

Related Art

A mobile communication system has been developed to provide a voice service while ensuring an activity of a user. However, in the mobile communication system, not only a voice but also a data service is extended. At present, due to an explosive increase in traffic, there is a shortage of resources and users demand a higher speed service, and as a result, a more developed mobile communication system is required.

Requirements of a next-generation mobile communication system should be able to support acceptance of explosive data traffic, a dramatic increase in per-user data rate, acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

SUMMARY OF THE INVENTION

An embodiment of the present disclosure provides a method and a device for transmitting and receiving data in a wireless communication system.

Furthermore, an embodiment of the present disclosure provides a method for transmitting data by using full transmission power configured by a base station when UE transmits uplink data to the base station.

Furthermore, an embodiment of the present disclosure provides a method for transmitting information associated with a capability of the UE to the base station in order to determine transmission power of the uplink data when the UE transmits the uplink data to the base station.

Furthermore, an embodiment of the present disclosure provides a method for configuring a Transmit Precoding Matrix Indicator (TPMI) for transmitting the uplink data to the UE based on the information associated with the capability of the UE, which the base station receives from the UE.

Furthermore, an embodiment of the present disclosure provides a method for transmitting the transmission power of the uplink data with full transmission power based on the information associated with the capability of the UE, which the UE transmits to the base station and the TPMI configured by the base station.

Technical problems to be solved by the present disclosure are not limited by the above-mentioned technical problems, and other technical problems which are not mentioned above can be clearly understood from the following description by those skilled in the art to which the present disclosure pertains.

In order to solve the technical problem, provided is a method for transmitting a message in an initial access procedure by a user equipment (UE) in a wireless communication system, which includes: transmitting to a base station capability information associated with transmission power of the UE, in which the capability information includes a subset including at least one transmit precoding matrix indicator (TPMI) supported by the UE; receiving from the base station first control information for transmitting a message associated with an initial access, in which the first control information includes a TPMI used for the UE to transmit the message; and transmitting to the base station the message by using transmission power determined based on the TPMI, in which the transmission power is determined according to whether the TPMI is included in the at least one TPMI.

Furthermore, in the present disclosure, when the TPMI is included in the at least one TPMI, the transmission power is full transmission power.

Furthermore, in the present disclosure, a scaling factor for determining the transmission power is configured to '1'.

Furthermore, in the present disclosure, when the TPMI is not included in the at least one TPMI, the transmission power is a value smaller than the full transmission power.

Furthermore, in the present disclosure, the scaling factor for determining the transmission power is configured to a value smaller than '1'.

Furthermore, in the present disclosure, the method further includes receiving from the base station second control information including the full transmission power usable by the UE.

Furthermore, in the present disclosure, the second control information further includes mode information associated with at least one transmission mode applicable to the UE.

Furthermore, in the present disclosure, when the information is information associated with a specific capability of the UE, the transmission power is the full transmission power.

Furthermore, in the present disclosure, the method may further include when the information is the information associated with the specific capability of the UE, receiving from the base station a scaling value for determining the transmission power, and the transmission power determined based on the scaling value may be evenly distributed among a single or a plurality of antenna ports using non-zero power for transmitting an uplink channel.

Furthermore, provided is a user equipment (UE) transmitting uplink data transmission in a wireless communication system, which includes: one or more transceivers; one or more processors; and one or more memories storing instructions for operations executed by the one or more processors and connected to the one or more processors, in which the operations include transmitting to a base station capability information associated with transmission power of the UE, in which the capability information includes a subset including at least one transmit precoding matrix indicator (TPMI) supported by the UE, receiving from the base station first control information for transmitting a message associated with an initial access, in which the first control information includes a TPMI used for the UE to transmit the message, and transmitting to the base station the message by using transmission power determined based on the TPMI, and in which the transmission power is determined according to whether the TPMI is included in the at least one TPMI.

Furthermore, provided is a method for receiving a message in an initial access procedure by a base station in a wireless communication system, which includes: receiving from a UE capability information associated with transmission power of the UE, in which the capability information includes a subset including at least one transmit precoding matrix indicator (TPMI) supported by the UE; transmitting to the UE first control information for transmitting a message associated with an initial access, in which the first control information includes a TPMI used for the UE to transmit the message; and receiving from the UE the message by using transmission power determined based on the TPMI, in which the transmission power is determined according to whether the TPMI is included in the at least one TPMI.

Furthermore, provided is a base station receiving a message in an initial access procedure in a wireless communication system, which includes: one or more transceivers; one or more processors; and one or more memories storing instructions for operations executed by the one or more processors and connected to the one or more processors, in which the operations include receiving from a UE capability information associated with transmission power of the UE, in which the capability information includes a subset including at least one transmit precoding matrix indicator (TPMI) supported by the UE, transmitting to the UE first control information for transmitting a message associated with an initial access, in which the first control information includes a TPMI used for the UE to transmit the message, and receiving from the UE the message by using transmission power determined based on the TPMI, and in which the transmission power is determined according to whether the TPMI is included in the at least one TPMI.

Furthermore, provided is a device which includes: one or more memories; and one or more processors functionally connected to the one or more memories, in which the one or more processors are configured to transmit capability information associated with transmission power of the device, in which the capability information includes a subset including at least one transmit precoding matrix indicator (TPMI) supported by the UE, receive first control information for transmitting a message associated with an initial access, in which the first control information includes a TPMI used for the UE to transmit the message, and transmit the message by using transmission power determined based on the TPMI, and in which the transmission power is determined according to whether the TPMI is included in the at least one TPMI.

Furthermore, provided are one or more non-transitory computer-readable media storing one or more instructions, in which the one or more instructions executed by one or more processors are configured to transmit, by a user equipment (UE), to a base station capability information associated with transmission power of the UE, in which the capability information includes a subset including at least one transmit precoding matrix indicator (TPMI) supported by the UE, receive, by the UE, from the base station first control information for transmitting a message associated with an initial access, in which the first control information includes a TPMI used for the UE to transmit the message, and transmit, by the UE, to the base station the message by using transmission power determined based on the TPMI, and in which the transmission power is determined according to whether the TPMI is included in the at least one TPMI.

BRIEF DESCRIPTION OF THE DRAWINGS

The accompanying drawings, which are included to provide a further understanding of the present disclosure and constitute a part of the detailed description, illustrate embodiments of the present disclosure and together with the description serve to explain the principle of the present disclosure.

DESCRIPTION OF EXEMPLARY EMBODIMENTS

Figure 1:
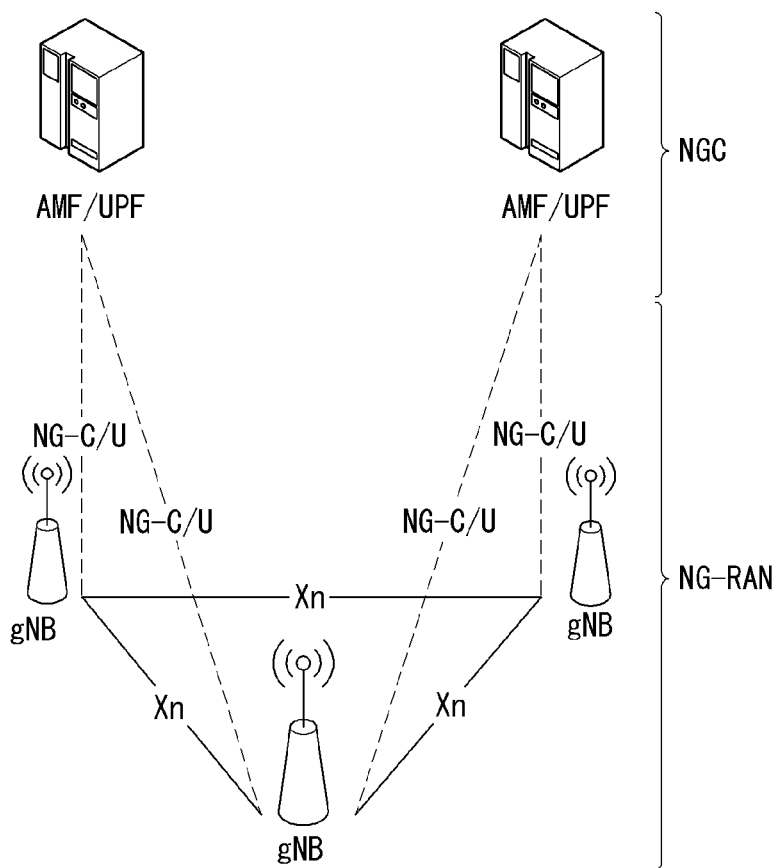
FIG. 1 is a diagram illustrating an example of an overall system structure of NR to which a method proposed in the present disclosure may be applied.

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure can be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In downlink, the transmitter may be part of the terminal and the receiver may be part of the terminal. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a standard document detail number. Matters disclosed in a standard document opened before the present disclosure may be referred to for a background art, terms, abbreviations, etc., used for describing the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver can drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system can support remote treatment providing clinical treatment at a distant place. This helps to reduce a barrier for the distance and can improve access to medical services which are not continuously used at remote farming areas. Furthermore, this is used to save life in important treatment and an emergency condition. A radio sensor network based on mobile communication can provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behaviour.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR (New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is 60 kHz or higher therethan, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$ and $N_f=4096$. DL and UL transmission is configured as a radio frame having a section of $T_f=(\Delta f_{max} N_f/100) \cdot T_s=10$ ms. The radio frame is composed of ten sub-frames each having a section of $T_{sf}=(\Delta f_{max}N_f/1000) \cdot T_s = 1$ ms. In this case, there may be a set of UL frames and a set of DL frames.

Figure 2:
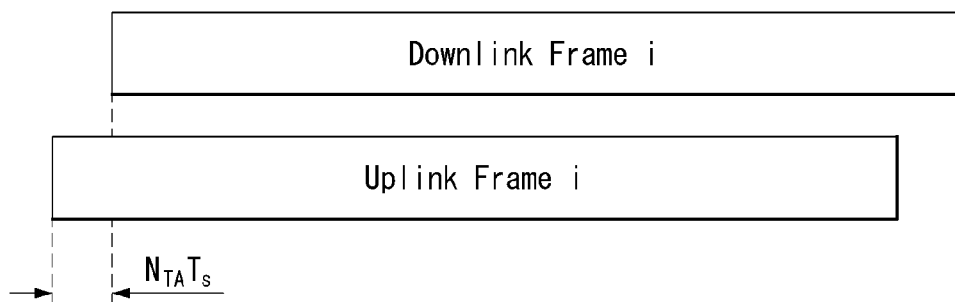
FIG. 2 illustrates a relationship between an uplink frame and a downlink frame in a wireless communication system to which a method proposed in the present disclosure may be applied.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe, \mu}$ |
|---|---|---|---|
| 2 | 12 | 40 | 4 |

Figure 3:
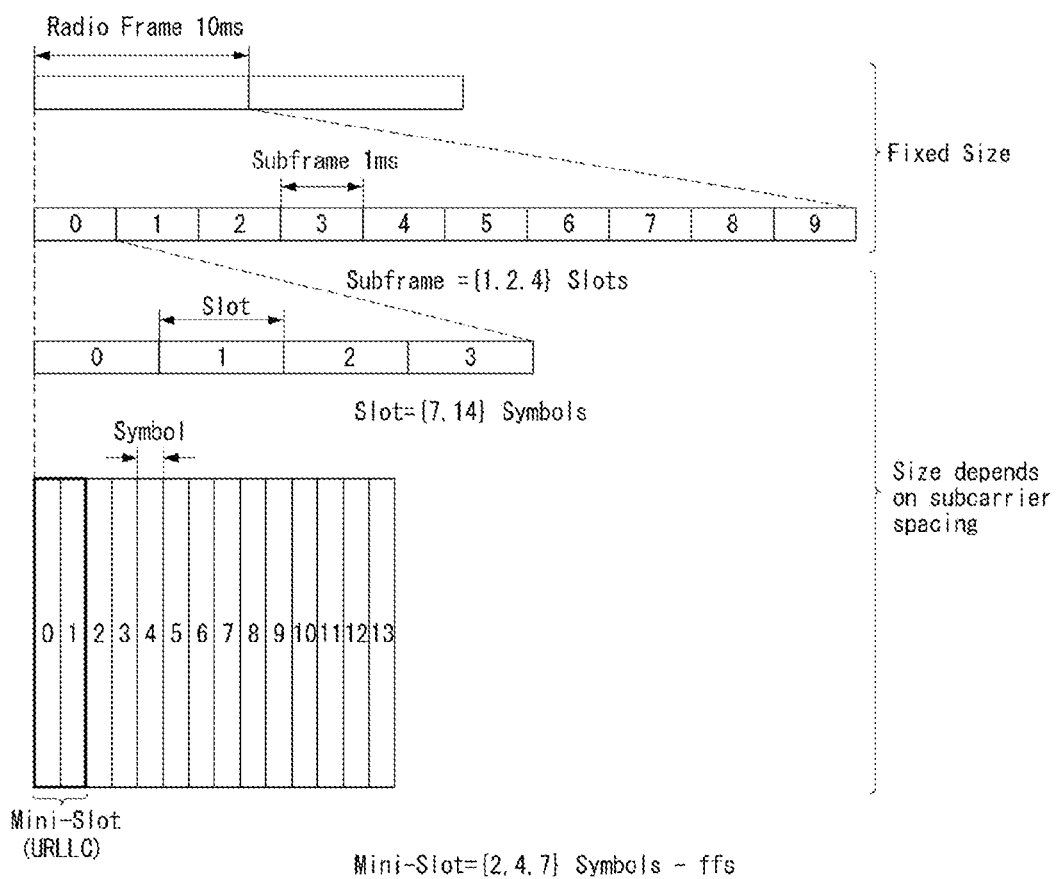
FIG. 3 illustrates an example of a frame structure in an NR system.

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. may be considered.

Hereinafter, the above physical resources that can be considered in the NR system are described in more detail.

First, in regard to an antenna port, the antenna port is defined so that a channel over which a symbol on an antenna port is conveyed can be inferred from a channel over which another symbol on the same antenna port is conveyed. When large-scale properties of a channel over which a symbol on one antenna port is conveyed can be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
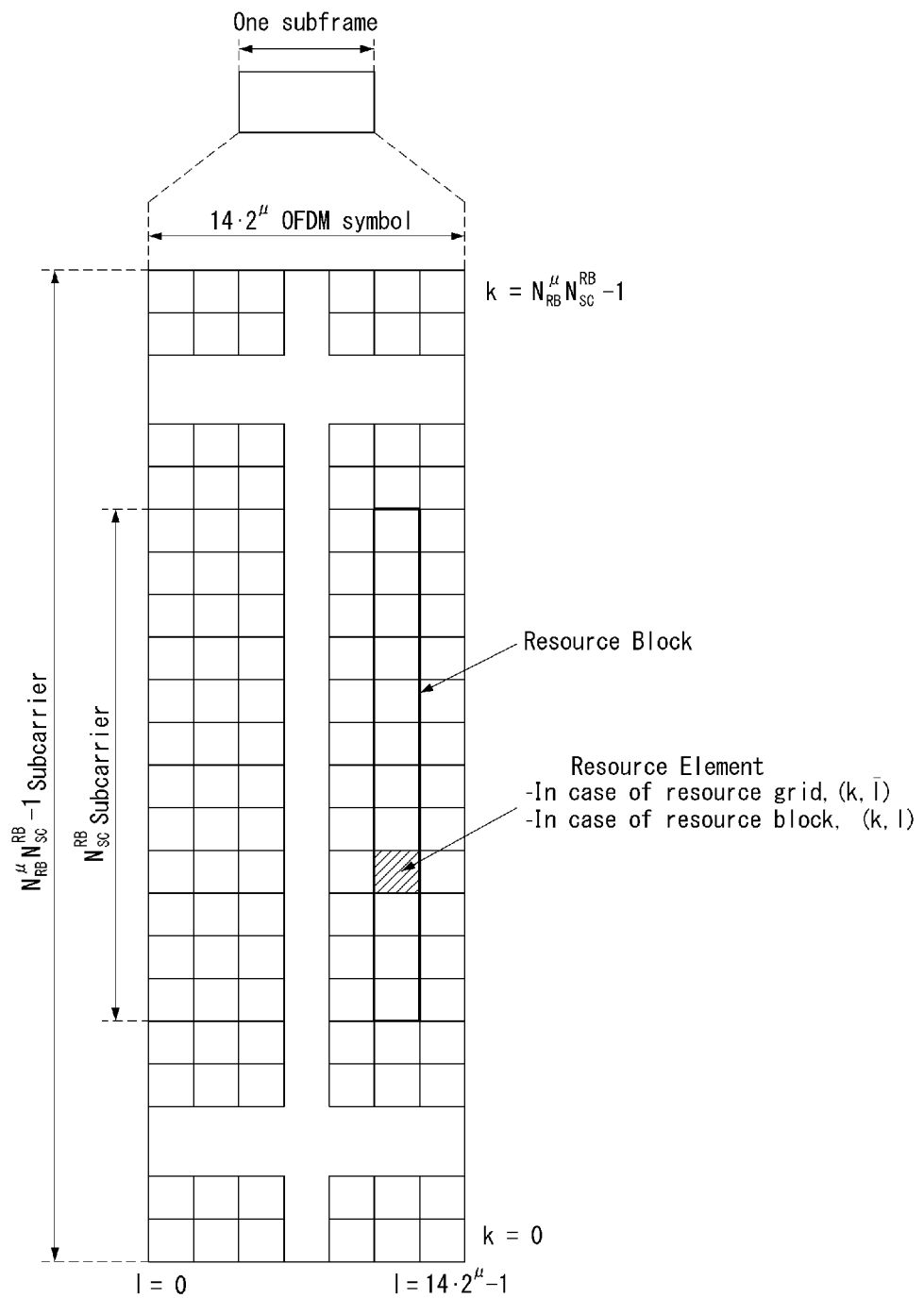
FIG. 4 illustrates an example of a resource grid supported by a wireless communication system to which a method proposed in the present disclosure may be applied.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$. $N_{RB}^{max,\mu}$ denotes a maximum transmission bandwidth and may change not only between numerologies but also between uplink and downlink.

Figure 5:
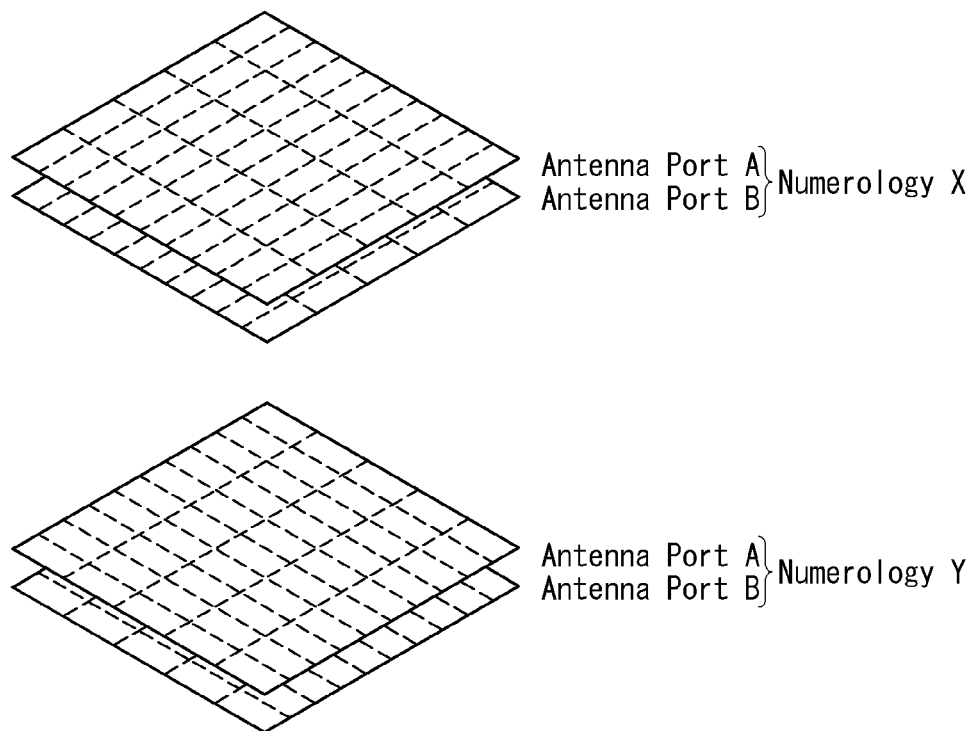
FIG. 5 illustrates examples of a resource grid for each antenna port and numerology to which a method proposed in the present disclosure may be applied.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where k=0, . . . , $N_{RB}^\mu N_{sc}^{RB}-1$ is an index on a frequency domain, and l̄=0 . . . , $2^\mu N_{symb}^{(\mu)}-1$ refers to a location of a symbol in a subframe. The index pair (k,l̄) is used to refer to a resource element in a slot, where l=0, . . . , $N_{symb}^\mu - 1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indexes p and μ may be dropped, and as a result, the complex value may be $a_{k,\bar{l}}^{(p)}$ or $a_{k,\bar{l}}$.

Further, a physical resource block is defined as $N_{sc}^{RB}=12$ consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN).

The common resource blocks are numbered from 0 and upwards in the frequency domain for subcarrier spacing configuration μ.

The center of subcarrier 0 of common resource block 0 for the subcarrier spacing configuration μ coincides with 'point A'. A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. of the BWP. A relation between the physical resource block $n_{PRB}$ in BWP i and the common resource block $n_{CRB}$ may be given by the following Equation 2.

$$n_{CRB}=n_{PRB}+N_{BWP,i}^{start} \quad \text{[Equation 2]}$$

Here, $N_{BWP,i}^{start}$ may be the common resource block where the BWP starts relative to the common resource block 0.

Physical Channel and General Signal Transmission

Figure 6:
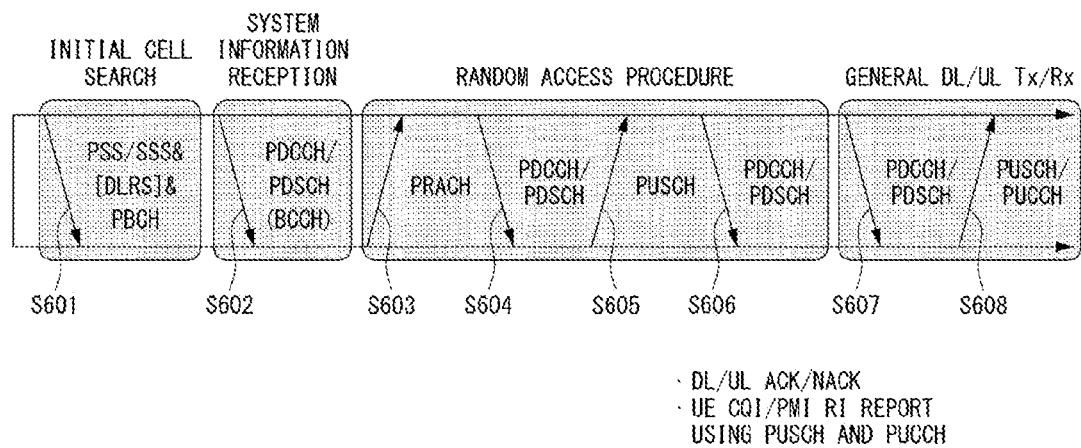
FIG. 6 illustrates physical channels and general signal transmission used in a 3GPP system.

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Figure 7:
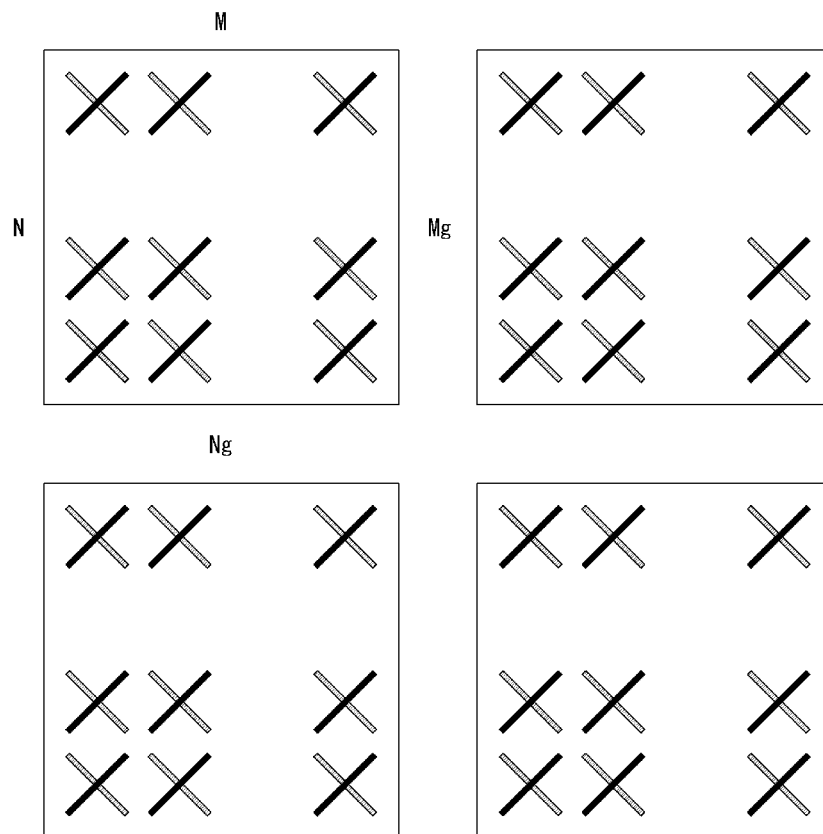
FIG. 7 is a diagram illustrating an example of an antenna array to which a method proposed in the present disclosure may be applied.

FIG. 7 is a diagram illustrating an example of an antenna array to which a method proposed in the present disclosure may be applied.

In FIG. 7, the normalized panel antenna array may be constituted by Mg panels and Ng panels in a horizontal domain and a vertical domain, respectively.

In this case, one panel is constituted by M columns and N rows, respectively, and an X-pol antenna is assumed in FIG. 7. Therefore, the total number of antenna elements may be 2*M*N*Mg*Ng.

Beam Management (BM)

A BM procedure as layer 1 (L1)/layer 2 (L2) procedures for acquiring and maintaining a set of base station (e.g., gNB, TRP, etc.) and/or terminal (e.g., UE) beams which may be used for downlink (DL) and uplink (UL) transmission/reception may include the following procedures and terms.

Beam measurement: Operation of measuring characteristics of a beam forming signal received by the eNB or UE.

Beam determination: Operation of selecting a transmit (Tx) beam/receive (Rx) beam of the eNB or UE by the eNB or UE.

Beam sweeping: Operation of covering a spatial region using the transmit and/or receive beam for a time interval by a predetermined scheme.

Beam report: Operation in which the UE reports information of a beamformed signal based on beam measurement.

The BM procedure may be divided into (1) a DL BM procedure using a synchronization signal (SS)/physical broadcast channel (PBCH) Block or CSI-RS and (2) a UL BM procedure using a sounding reference signal (SRS).

Further, each BM procedure may include Tx beam sweeping for determining the Tx beam and Rx beam sweeping for determining the Rx beam.

Downlink Beam Management (DL BM)

Figure 8:
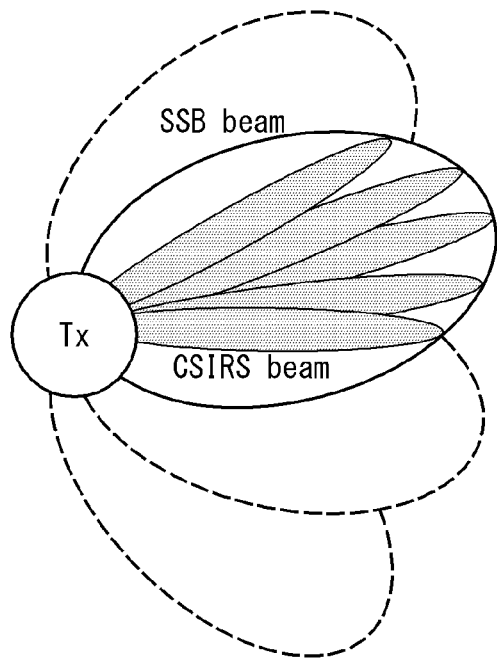
FIG. 8 is a diagram illustrating an example of a beam used for beam management.

FIG. 8 is a diagram illustrating an example of a beam used for beam management.

The DL BM procedure may include (1) transmission of beamformed DL reference signals (RSs) (e.g., CIS-RS or SS Block (SSB)) of the eNB and (2) beam reporting of the UE.

Here, the beam reporting a preferred DL RS identifier (ID)(s) and L1-Reference Signal Received Power (RSRP).

The DL RS ID may be an SSB Resource Indicator (SSBRI) or a CSI-RS Resource Indicator (CRI).

As illustrated in FIG. 8, an SSB beam and a CSI-RS beam may be used for the beam management. A measurement metric is an L1-RSRP for each resource/block. The SSB may be sued for coarse beam management and the CSI-RS may be sued for fine beam management. The SSB may be used for both the Tx beam sweeping and the Rx beam sweeping.

The Rx beam sweeping using the SSB may be performed while the UE changes the Rx beam for the same SSBRI across multiple SSB bursts. Here, one SS burst includes one or more SSBs and one SS burst set includes one or more SSB bursts.

DL BM Using SSB

Figure 9:
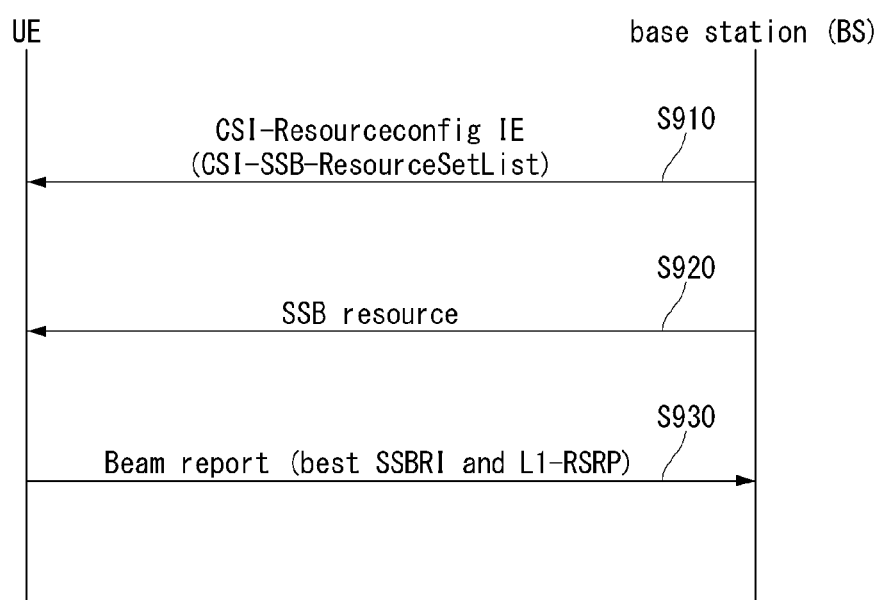
FIG. 9 is a flowchart showing an example of a downlink beam management procedure.

FIG. 9 is a flowchart showing an example of a downlink beam management procedure.

A configuration for beam report using the SSB is performed during a CSI/beam configuration in an RRC connected state (or RRC connected mode).

The UE receives from the eNB CSI-ResourceConfig IE including CSI-SSB-ResourceSetList including SSB resources used for the BM (S901).

Table 5 shows an example of CSI-ResourceConfig IE and as shown in Table A, a BM configuration using the SSB is not separately defined and the SSB is configured like the CSI-RS resource.

TABLE 5

```
-- ASN1START START
-- TAG-CSI-RESOURCECONFIG-START
CSI-ResourceConfig ::=      SEQUENCE {
    csi-ResourceConfigId       CSI-ResourceConfigId,
    csi-RS-ResourceSetList     CHOICE {
       nzp-CSI-RS-SSB           SEQUENCE {
          nzp-CSI-RS-ResourceSetList    SEQUENCE {(SIZE (1..maxNrofNZP-CSI-RS-
ResourceSetsPerConfig) ) OF NZP-CSI-RS-ResourceSetId OPTIONAL,
          csi-SSB-ResourceSetList       SEQUENCE (SIZE (1..maxNrofCSI-SSB-
ResourceSetsPerConfig)) OF CSI-SSB-ResourceSetId   OPTIONAL
       },
       csi-IM-ResourceSetList        SEQUENCE (SIZE (1..maxNrofCSI-IM-
ResourceSetsPerConfig) ) OF CSI-IM-ResourceSetId
    },
    bwp-Id                   BWP-Id,
    resourceType             ENUMERATED { aperiodic, semiPersistent,
periodic },
    ...
},
-- TAG-CSI-RESOURCECONFIGTOADDMOD-STOP
-- ASN1STOP
```

In Table 5, csi-SSB-ResourceSetList parameter represents a list of SSB resources used for beam management and reporting in one resource set. Here, SSB resource set may be configured as {SSBx1, SSBx2, SSBx3, SSBx4, . . . }. SSB index may be defined as 0 to 63.

The UE receives from the eNB the SSB resource based on the CSI-SSB-ResourceSetList (S920).

When CSI-RS reportConfig associated with reporting of SSBRI and L1-RSRP is configured, the UE (beam) reports to the eNB best SSBRI and L1-RSRP corresponding thereto (S930).

In other words, when reportQuantity of the CSI-RS reportConfig IE is configured as 'ssb-Index-RSRP', the UE reports to the eNB best SSBRI and L1-RSRP corresponding thereto.

In addition, when the CSI-RS resource is configured in the same OFDM symbol(s) as SSB (SS/PBCH Block) and 'QCL-TypeD' is applicable, the UE may assume that the CSI-RS and the SSB are quasi co-located from the viewpoint of 'QCL-TypeD'.

Here, the QCL TypeD may mean that antenna ports are QCL from the viewpoint of a spatial Rx parameter. When the UE receives a plurality of DL antenna ports having a QCL Type D relationship, the same Rx beam may be applied. Further, the UE does not expect that the CSI-RS is configured in an RE overlapped with the RE of the SSB.

DL BM Using CSI-RS

In respect to a CSI-RS usage, i) when a repetition parameter is configured in a specific CSI-RS resource set and TRS_info is not configured, the CSI-RS is used for the beam management. ii) When the repetition parameter is not configured and TRS_info is configured, the CSI-RS is used for a tracking reference signal (TRS). iii) When the repetition parameter is not configured and TRS_info is not configured, the CSI-RS is used for CSI acquisition.

The repetition parameter may be configured only for CSI-RS resource sets associated with CSI-ReportConfig having a report of L1 RSRP or 'No Report (or None)'.

When the UE is configured with CSI-ReportConfig in which reportQuantity is configured as 'cri-RSRP' or 'none' and CSI-ResourceConfig (higher layer parameter resources-ForChannelMeasurement) for channel measurement includes not higher layer parameter 'trs-Info' but NZP-CSI-RS-ResourceSet in which higher layer parameter 'repetition' is configured, the UE may be configured only with the same number of port (1-port or 2-port) having higher layer parameter 'nrofPorts' for all CSI-RS resources in NZP-CSI-RS-ResourceSet.

When (higher layer parameter) repetition is configured to 'ON', (higher layer parameter) repetition is associated with the Rx beam sweeping procedure of the UE. In this case, when the UE is configured with NZP-CSI-RS-ResourceSet, the UE may assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through the same Tx beam. Here, at least one CSI-RS resource in NZP-CSI-RS-ResourceSet may be transmitted to different OFDM symbols. Further, the UE does not expect that different periodicities are received at periodicity AndOffset in all CSI-RS resources in NZP-CSI-RS-Resourceset.

On the contrary, when Repetition is configured to 'OFF', the Repetition is associated with the Tx beam sweeping procedure of the eNB. In this case, when repetition is configured to 'OFF', the UE does not assume that at least one CSI-RS resource in NZP-CSI-RS-ResourceSet is transmitted to the same downlink spatial domain transmission filter. In other words, at least one CSI-RS resource in NZP-CSI-RS-ResourceSet is transmitted through different Tx beams.

Figure 10A:
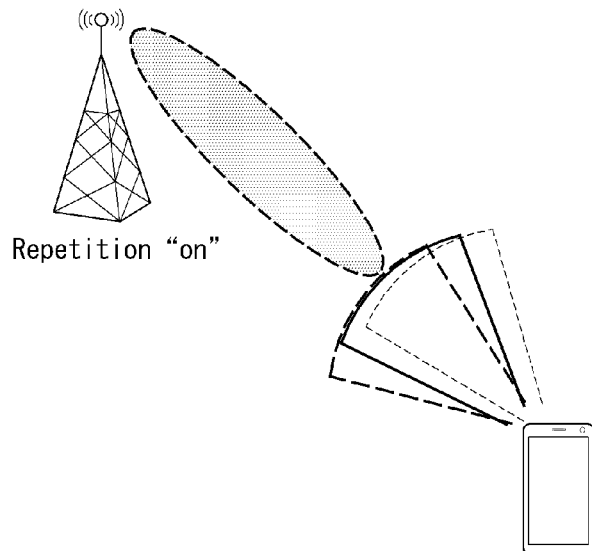
FIGS. 10A and B illustrate an example of a downlink beam management procedure using a Channel State Information-Reference Signal (CSI-RS).
Figure 10B:
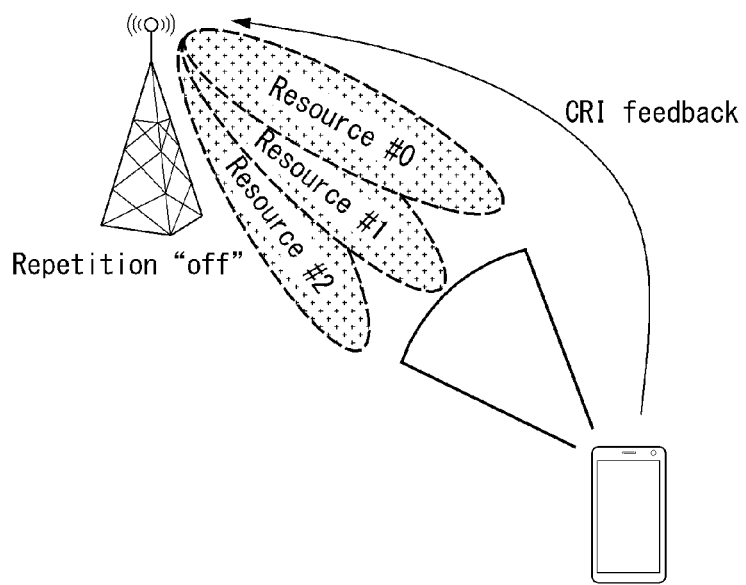

FIGS. 10A and 10B illustrates an example of a downlink beam management procedure using a Channel State Information-Reference Signal (CSI-RS).

FIG. 10A illustrates an Rx beam determination (or refinement) procedure of the UE and FIG. 10B illustrates a Tx beam sweeping procedure of the eNB. Further, FIG. 10A illustrates a case where the repetition parameter is configured to 'ON' and FIG. 10B illustrates a case where the repetition parameter is configured to 'OFF'.

Figure 11:
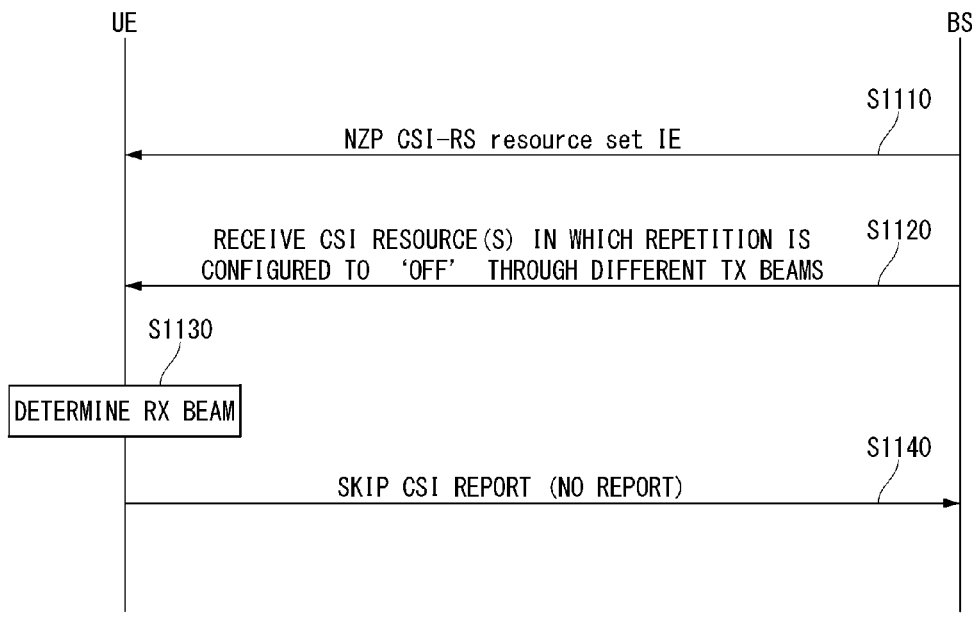
FIG. 11 is a flowchart showing an example of a receive beam determination process of a UE.

Referring to FIG. 10B and FIG. 11, an Rx beam determination process of the UE will be described.

FIG. 11 is a flowchart showing an example of a receive beam determination process of a UE.

The UE receives, from the eNB, NZP CSI-RS resource set IE including higher layer parameter repetition through RRC signaling (S1110). Here, the repetition parameter is configured to 'ON'.

The UE repeatedly receives a resource(s) in CSI-RS resource set configured as repetition 'ON' in different OFDM symbols through the same Tx beam (or DL spatial domain transmission filter) of the eNB (S1120).

The UE determines the Rx beam thereof (S1130).

The UE skips CSI report (S1140). In this case, reportQuantity of CSI report config may be configured as 'No report (or None)'.

In other words, the UE may skip the CSI report when repetition 'ON' is configured.

Figure 12:
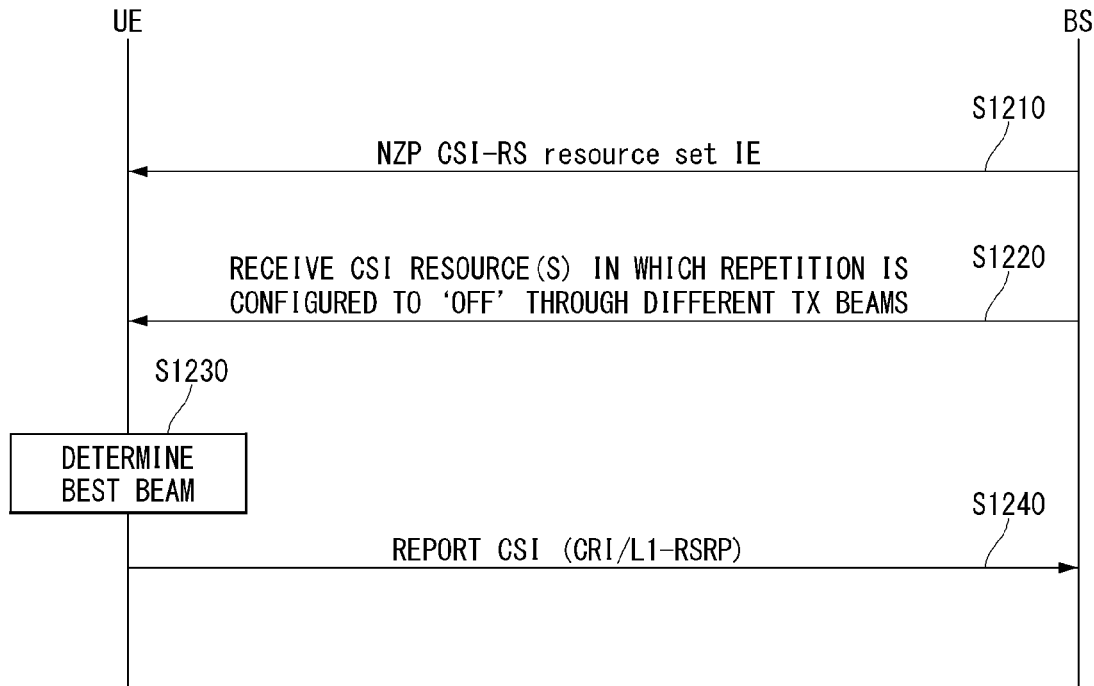
FIG. 12 is a flowchart showing an example of a transmit beam determination process of an eNB.

Referring to FIG. 10B and FIG. 12, a Tx beam determination process of the eNB will be described.

FIG. 12 is a flowchart showing an example of a transmit beam determination process of an eNB.

The UE receives, from the eNB, NZP CSI-RS resource set IE including higher layer parameter repetition through RRC signaling (S1210). Here, the repetition parameter is configured to 'OFF' and associated with the Tx beam sweeping procedure of the eNB.

The UE receives a resource(s) in CSI-RS resource set configured as repetition 'OFF' through different Tx beams (DL spatial domain transmission filters) of the eNB (S1220).

The UE selects (or determines) a best beam (S1230).

The UE reports to the eNB an ID for the selected beam and related quality information (e.g., L1-RSRP) (S1240). In this case, reportQuantity of CSI report config may be configured as 'CRI+L1-RSRP'.

In other words, when the CSI-RS is transmitted for the BM, the UE reports to the eNB the CRI and L1-RSRP therefor.

Figure 13:
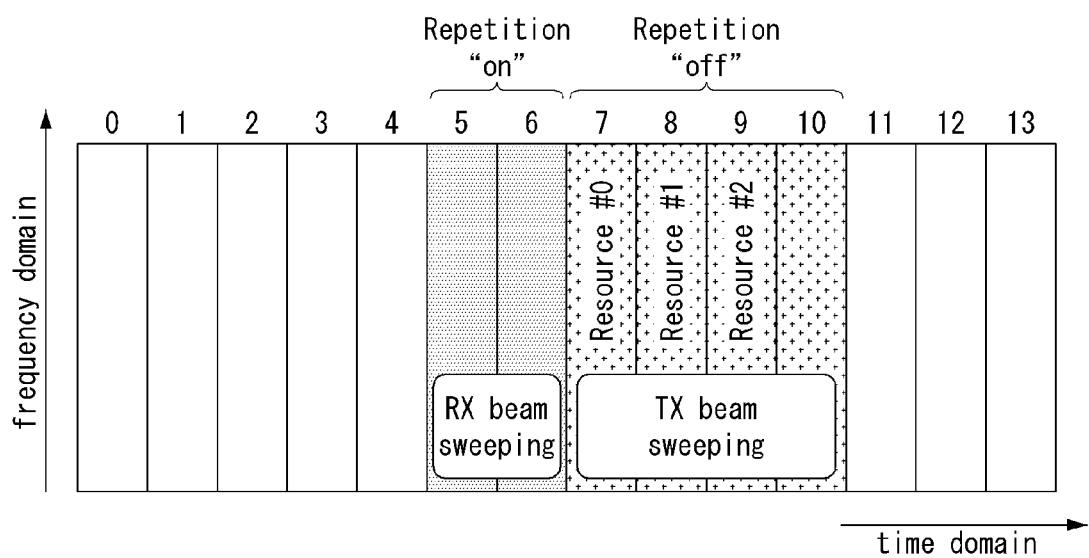
FIG. 13 illustrates an example of resource allocation in time and frequency domains associated with a DL BM procedure using the CSI-RS.

FIG. 13 illustrates an example of resource allocation in time and frequency domains associated with a DL BM procedure using the CSI-RS.

Specifically, it can be seen that when repetition 'ON' is configured in the CSI-RS resource set, a plurality of CSI-RS resources is repeatedly used by applying the same Tx beam and when repetition 'OFF' is configured in the CSI-RS resource set, different CSI-RS resources are transmitted by different Tx beams.

DL BM Associated Beam Indication

The UE may be RRC-configured with a list for a maximum of M candidate Transmission Configuration Indication (TCI) states at least for a purpose of Quasi Co-location (QCL) indication. Here, the M may be 64.

Each TCI state may be configured as one RS set. One of DL RS types including SSB, P-CSI RS, SP-CSI RS, A-CSI RS, and the like may be at least referred to for an ID of each DL RS for a purpose of spatial QCL (QCL Type D) in the RS set.

Initialization/update of the ID of the DL RS(s) in the RS set used for the purpose of the spatial QCL may be at least performed through explicit signaling.

Table 6 shows an example of TCI-State IE.

The TCI-State IE is associated with a quasi co-location (QCL) type corresponding to one or two DL reference signals (RSs).

TABLE 6

```
-- ASN1START
-- TAG-TCI-STATE-START
TCI-State ::=                SEQUENCE {
    tci-StateId                 TCI-StateId,
    qcl-Type1                   QCL-Info,
    qcl-Type2                   QCL-Info
                                OPTIONAL, -- Need R
```

TABLE 6-continued

```
}
QCL-Info ::=                 SEQUENCE {
    cell                         ServCellIndex
                                 OPTIONAL, -- Need R
    bwp-Id                       BWP-Id
                                 OPTIONAL, -- Cond CSI-RS-Indicated
    referenceSignal              CHOICE {
        csi-rs                       NZP-CSI-RS-ResourceId,
        ssb                          SSB-Index
    },
    qcl-Type                     ENUMERATED {typeA, typeB,
                                 typeC, typeD},
    ...
}
-- TAG-TCI-STATE-STOP
-- ASN1STOP
```

In Table 6, bwp-Id parameter represents DL BWP in which the RS is located, cell parameter represents a carrier in which the RS is located, and reference signal parameter represents a reference antenna port(s) which becomes a source of quasi co-location for a corresponding target antenna port(s) or a reference signaling including the same. The target antenna port(s) may be CSI-RS, PDCCH DMRS, or PDSCH DMRS. As an example, corresponding TCI state ID may be indicated for NZP CSI-RS resource configuration information in order to indicate QCL reference RS information for NZP CSI-RS. As another example, the TCI state ID may be indicated for each CORESET configuration in order to indicate QCL reference information for a PDCCH DMRS antenna port(s). As yet another example, the TCI state ID may be indicated through DCI in order to indicate QCL reference information for a PDSCH DMRS antenna port(s).

QCL (Quasi-Co Location)

The antenna port is defined so that a channel in which the symbol on the antenna port is transported may be inferred from a channel in which different symbols on the same antenna port are transported. When a property of a channel in which a symbol on one antenna port is transported may be interred from a channel in which symbols on different antenna ports are transported, two antenna ports may have a quasi co-located or quasi co-location (QC/QCL) relationship.

Here, the channel property includes at least one of a delay spread, a Doppler spread, a frequency/Doppler shift, average received power, received timing/average delay, and a spatial Rx parameter. Here, the spatial Rx parameter means a spatial (receive) channel property parameter such as angle of arrival.

The US may be configured as a list of up to M TCI-State configurations in higher layer parameter PDSCH-Config in order to decode the PDSCH according to detected PDCCH having an intended DCI for the corresponding UE and a given serving cell. The M depends on a UE capability.

Each TCI-State includes a parameter for configuring a quasi co-location relationship between one or two DL reference signals and a DM-RS port of the PDSCH.

The quasi co-location relationship is configured as higher layer parameter qcl-Type1 for a first DL RS and qcl-Type2 (when configured) for a second DL RS. Two DL RSs are not the same as each other in terms of QCL type regardless of whether two DL RS are DL RSs having the same reference or DL RSs having different references.

A quasi co-location type corresponding to each DL RS may be given by higher layer parameter qcl-Type of QCL-Info and may take one of the following values:

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is specific NZP CSI-RS, corresponding NZP CSI-RS antenna ports may be indicated/configured to be QCL with specific TRS from the viewpoint of QCL-Type A and specific SSB from the viewpoint of QCL-Type D. The UE that receives the indication/configuration may receive the corresponding NZP CSI-RS by using a Doppler delay value measured in QCL-TypeA TRS and apply an Rx beam used for receiving QCL-TypeD SSB to reception of the corresponding NZP CSI-RS.

The UE may receive an activation command by MAC CE signaling used for mapping up to eight TCI states to codepoint of DCI field "Transmission Configuration Indication".

UL BM

In the case of UL BM, beam reciprocity (or beam correspondence) between the Tx beam and the Rx beam may be established or not established according to UE implementation. If the reciprocity between the Tx beam and the Tx beam is established in both the eNB and the UE, a UL beam pair may be matched through a DL beam pair. However, when the reciprocity between the Tx beam and the Rx beam is not established even in any one of the eNB and the UE, a UL beam pair determination process is required apart form DL beam pair determination.

Further, even when the eNB and the UE maintain beam correspondence, the eNB may use a UL BM procedure in order to determine a DL Tx beam without requesting report of a preferred beam by the UE.

The UL BM may be performed through beamformed UL SRS transmission and whether to apply UL BM of the SRS resource set is configured by a (higher layer parameter) usage. When the usage is configured as 'BeamManagement (BM)', only one SRS resource may be transmitted to each of a plurality of SRS resource sets at a given time instant.

The UE may be configured with one or more Sounding Reference Symbol (SRS) resource sets configured by (higher layer parameter) SRS-ResourceSet (through higher layer signaling, RRC signaling, etc.). For each SRS resource set, the UE may be configured with K ($\geq$1) SRS resources (higher later parameter SRS-resources). Here, K is a natural number and a maximum value of K is indicated by SRS_capability.

Similarly to the DL BM, a UL BM procedure may also be divided into Tx beam sweeping of the UE and Rx beam sweeping of the eNB.

Figure 14A:
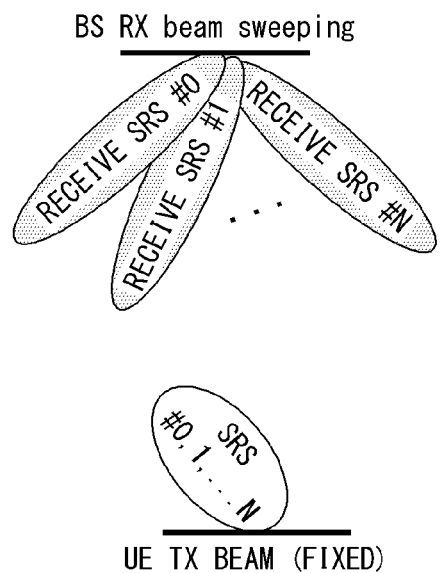
FIGS. 14A and B illustrate an example of an uplink beam management procedure using a Sounding Reference Signal (SRS).
Figure 14B:
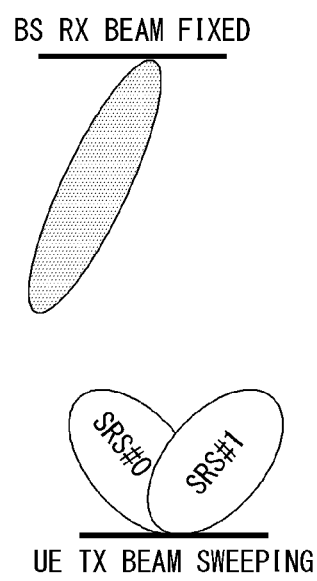

FIGS. 14A and 14B illustrates an example of an uplink beam management procedure using a Sounding Reference Signal (SRS). FIG. 14A illustrates an Rx beam determination procedure of the eNB and FIG. 14B illustrates a Tx beam sweeping procedure of the UE.

Figure 15:
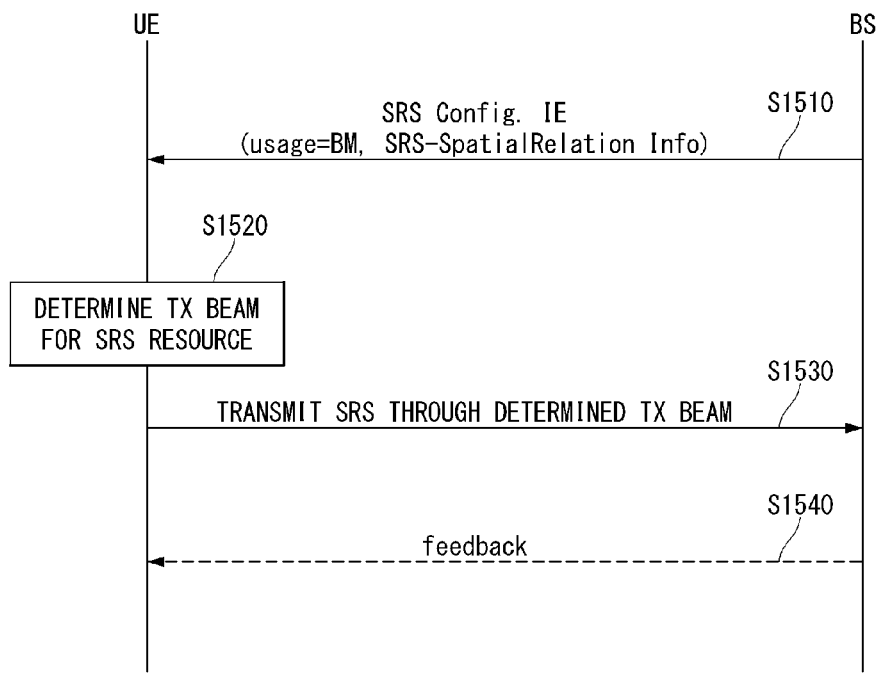
FIG. 15 is a flowchart showing an example of an uplink beam management procedure using the SRS.

FIG. 15 is a flowchart showing an example of an uplink beam management procedure using the SRS.

The UE receives, from the eNB, RRC signaling (e.g., SRS-Config IE) including a (higher layer parameter) usage parameter configured as 'beam management' (S15010).

Table 7 shows an example of SRS-Config Information Element (IE) and SRS-Config IE is used for an SRS transmission configuration. SRS-Config IE includes a list of SRS-Resources and a list of SRS-ResourceSets. Each SRS resource set means a set of SRS-resources.

The network may trigger transmission of the SRS resource set by using configured aperiodicSRS-ResourceTrigger (L1 DCI).

TABLE 7

```
-- ASN1START
-- TAG-MAC-CELL-GROUP-CONFIG-START
SRS-Config ::=                    SEQUENCE {
    srs-ResourceSetToReleaseList      SEQUENCE (SIZE(1..maxNrofSRS-ResourceSets))
OF SRS-ResourceSetId              OPTIONAL,  -- Need N
    srs-ResourceSetToAddModList       SEQUENCE ( SIZE (1..maxNrofSRS-ResourceSets))
                                  OF
SRS-ResourceSet                   OPTIONAL,  -- Need N
    srs-ResourceToReleaseList         SEQUENCE (SIZE(1..maxNrofSRS-Resources)) OF
SRS-ResourceId                    OPTIONAL,  -- Need N
    srs-ResourceToAddModList          SEQUENCE (SIZE(1..maxNrofSRS-Resources)) OF
SRS-Resource                      OPTIONAL,  -- Need N
      tpc-Accumulation                    ENUMERATED {disabled}
                                      OPTIONAL,  -- Need S
    ...
}
SRS-ResourceSet ::=               SEQUENCE {
    srs-ResourceSetId                 SRS-ResourceSetId,
    srs-ResourceIdList                SEQUENCE (SIZE(1..maxNrofSRS-
ResourcesPerSet)) OF SRS-ResourceId   OPTIONAL,  -- Cond Setup
    resourceType                      CHOICE {
      aperiodic                         SEQUENCE {
        aperiodicSRS-ResourceTrigger      INTEGER (1..maxNrofSRS-
TriggerStates-1),
        csi-RS                            NZP-CSI-RS-ResourceId
                                      OPTIONAL,  -- Cond NonCodebook
        slotOffset                        INTEGER (1..32)
                                      OPTIONAL,  -- Need S
        ...
      },
      semi-persistent                   SEQUENCE {
        associatedCSI-RS                  NZP-CSI-RS-ResourceId
                                      OPTIONAL, -- Cond NonCodebook
        ...
```

TABLE 7-continued

```
    },
    periodic                          SEQUENCE {
        associatedCSI-RS                  NZP-CSI-RS-ResourceId
                                      OPTIONAL, -- Cond NonCodebook
        ...
    }
},
usage                                 ENUMERATED {beamManagement, codebook,
nonCodebook, antennaSwitching},
alpha                                 Alpha
                                      OPTIONAL, -- Need S
p0                                    INTEGER (-202..24)
                                      OPTIONAL, -- Cond Setup
pathlossReferenceRS                   CHOICE {
    ssb-Index                             SSB-Index,
    csi-RS-Index                          NZP-CSI-RS-ResourceId
SRS-SpatialRelationInfo ::=           SEQUENCE {
    servingCellId                         ServCellIndex
    OPTIONAL,  -- Need S
    referenceSignal                       CHOICE {
        ssb-Index                             SSB-Index,
        csi-RS-Index                          NZP-CSI-RS-ResourceId,
        srs                                   SEQUENCE {
            resourceId                            SRS-ResourceId,
            uplinkBWP                             BWP-Id
        }
    }
}
SRS-ResourceId ::=                    INTEGER (0..maxNrofSRS-Resources-1)
```

In Table 7, usage represents a higher layer parameter indicating whether the SRS resource set is used for the beam management or whether the SRS resource set is used for codebook based or non-codebook based transmission. The usage parameter corresponds to L1 parameter 'SRS-SetUse'. 'spatialRelationInfo' is a parameter representing a configuration of a spatial relation between a reference RS and a target SRS. Here, the reference RS may become SSB, CSI-RS, or SRS corresponding to L1 parameter 'SRS-SpatialRelationInfo'. The usage is configured for each SRS resource set.

The UE determines a Tx beam for an SRS resource to be transmitted based on SRS-SpatialRelation Info included in the SRS-Config IE (S1520). Here, SRS-SpatialRelation Info is configured for each SRS resource and represents a beam which is the same as the beam used in the SSB, the CSI-RS, or the SRS is to be applied for each SRS resource. Further, SRS-SpatialRelationInfo may be configured or not configured in each SRS resource.

If SRS-SpatialRelationInfo is configured in the SRS resource, SRS-SpatialRelationInfo is transmitted by applying the beam which is the same as the beam used in the SSB, the CSI-RS, or the SRS. However, if SRS-SpatialRelationInfo is not configured in the SRS resource, the UE arbitrarily determines the Tx beam and transmits the SRS through the determined Tx beam (S1530).

More specifically, for P-SRS in which 'SRS-ResourceConfigType' is configured as 'periodic':

ii) When SRS-SpatialRelationInfo is configured as SSB/PBCH', the UE transmits the corresponding SRS resource by applying a spatial domain transmission filter which is the same as a spatial domain Rx filter used for receiving the SSB/PBCH (or generated from the corresponding filter); or ii) When SRS-SpatialRelationInfo is configured as CSI-RS', the UE transmits the SRS resource by applying the same spatial domain transmission filter used for receiving periodic CSI-RS or SP CSI-RS; or iii) When SRS-SpatialRelationInfo is configured as 'SRS', the UE transmits the SRS resource by applying the same spatial domain transmission filter used for transmitting the periodic CSI-RS.

Even when SRS-ResourceConfigType' is configured as 'SP-SRS' or 'AP-SRS', beam determination and transmission operations may be applied similarly thereto.

Additionally, the UE may receive or not receive a feedback for the SRS from the eNB like three following cases (S1540).

i) When Spatial_Relation_Info is configured for all SRS resources in the SRS resource set, the UE transmits the SRS with the beam indicated by the eNB. For example, when all Spatial_Relation_Info indicates the same SSB, CRI, or SRI, the UE repeatedly transmits the SRS with the same beam. This case as a usage of selecting the Rx beam by the eNB corresponds to FIG. 14A.

ii) Spatial_Relation_Info may not be configured for all SRS resources in the SRS resource set. In this case, the UE may transmit the SRS while arbitrarily changing the SRS beam. In other words, this case as a usage of selecting the Tx beam by the UE corresponds to FIG. 16(*b*).

iii) Spatial_Relation_Info may be configured for some SRS resources in the SRS resource set. In this case, the SRS may be transmitted with the beam configured for the configured SRS resource and the UE may arbitrarily transmit the SRS by applying the Tx beam to an SRS resource in which Spatial_Relation_Info is not configured.

Channel State Information Related Procedure

Figure 16:
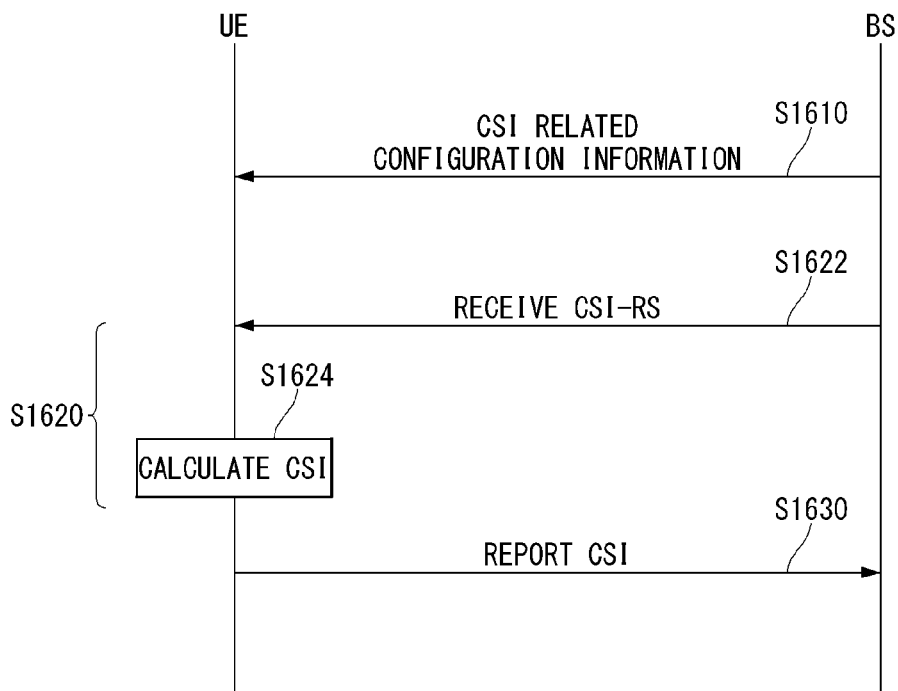
FIG. 16 is a flowchart showing an example of a CSI associated procedure to which a method proposed in the present disclosure may be applied.

FIG. 16 is a flowchart showing an example of a CSI associated procedure to which a method proposed in the present disclosure may be applied.

In a New Radio (NR) system, a channel state information-reference signal (CSI-RS) is used for time and/or frequency tracking, CSI computation, layer 1 (L1)-reference signal received power (RSRP) computation, and mobility.

The expression of 'A and/or B' used in the present disclosure may be construed as the same meaning as 'including at least one of A and B'.

The CSI computation is related to CSI acquisition and L1-RSRP computation is related to beam management (BM).

Channel state information (CSI) collectively refers to information that may indicate the quality of a radio channel (or referred to as a link) formed between the UE and the antenna port.

In order to perform one of usages of the CSI-RS, a terminal (e.g., user equipment (UE)) receives, from a base station (e.g., general Node B or gNB), configuration information related to the CSI through radio resource control (RRC) signaling (S1610).

The configuration information related to the CSI may include at least one of CSI-interference management (IM) resource related information, CSI measurement configuration related information, CSI resource configuration related information, CSI-RS resource related information, or CSI report configuration related information.

The CSI-IM resource related information may include CSI-IM resource information, CSI-IM resource set information, and the like.

The CSI-IM resource set is identified by a CSI-IM resource set identifier (ID) and one resource set includes at least one CSI-IM resource.

Each CSI-IM resource is identified by a CSI-IM resource ID.

The CSI resource configuration related information defines a group including at least one of a non zero power (NZP) CSI-RS resource set, a CSI-IM resource set, or a CSI-SSB resource set.

In other words, the CSI resource configuration related information may include a CSI-RS resource set list and the CSI-RS resource set list may include at least one of a NZP CSI-RS resource set list, a CSI-IM resource set list, or a CSI-SSB resource set list.

The CSI resource configuration related information may be expressed as CSI-ResourceConfig IE.

The CSI-RS resource set is identified by a CSI-RS resource set ID and one resource set includes at least one CSI-RS resource.

Each CSI-RS resource is identified by a CSI-RS resource ID.

As shown in Table 8, parameters (e.g., a BM related 'repetition' parameter and a tracking related 'trs-Info' parameter) representing the usage may be configured for each NZP CSI-RS resource set.

Table 8 shows an example of NZP CSI-RS resource set IE.

TABLE 8

```
-- ASN1START
-- TAG-NZP-CSI-RS-RESOURCESET-START
NZP-CSI-RS-ResourceSet ::=      SEQUENCE {
   nzp-CSI-ResourceSetId        NZP-CSI-RS-ResourceSetId,
   nzp-CSI-RS-Resources         SEQUENCE (SIZE (1..maxNrofNZP-
CSI-RS-ResourcesPerSet)) OF NZP-CSI-RS-ResourceId,
   repetition                   ENUMERATED { on, off }
                                OPTIONAL,
   aperiodicTriggeringOffset    INTEGER(0..4)
                                OPTIONAL, -- NeedS
   trs-Info                     ENUMERATED {true}
                                OPTIONAL, -- NeedR
   ...
}
-- TAG-NZP-CSI-RS-RESOURCESET-STOP
-- ASN1STOP
```

In Table 8, repetition parameter as a parameter representing whether the same beam is repeatedly transmitted indicates whether the repetition is 'ON' or 'OFF' for each NZP CSI-RS resource set.

The Tx beam used in the present disclosure may be construed as the same meaning as the spatial domain transmission filter and the Rx beam may be construed as the same meaning as the spatial domain reception filter.

For example, when the repetition parameter of Table 8 is configured to 'OFF', the UE does not assume that the NZP CSI-RS resource(s) in the resource set are transmitted with the same spatial domain transmission filter and the same Nrofports in all symbols.

In addition, the repetition parameter corresponding to the higher layer parameter corresponds to 'CSI-RS-ResourceRep' of L1 parameter.

The CSI report configuration related information includes a reportConfigType parameter representing a time domain behavior and a reportQuantity parameter representing a CSI related quantity for reporting.

The time domain behavior may be periodic, aperiodic, or semi-persistent.

In addition, the CSI report configuration related information may be expressed as CSI-ReportConfig IE and Table 9 below shows an example of CSI-ReportConfig IE.

TABLE 9

```
-- ASN1START
-- TAG-CSI-RESOURCECONFIG-START
CSI-ReportConfig ::=             SEQUENCE {
   reportConfigId                CSI-ReportConfigId,
   carrier                       ServCellIndex           OPTIONAL, -
- Need S
   resourcesForChannelMeasurement     CSI-ResourceConfigId,
   csi-IM-ResourcesForInterference    CSI-ResourceConfigId   OPTIONAL, -- Need R
   nzp-CSI-RS-ResourcesForInterference  CSI-ResourceConfigId   OPTIONAL, -- Need R
   reportConfigType              CHOICE {
      periodic                   SEQUENCE {
         reportSlotConfig           CSI-ReportPeriodicityAndOffset,
         pucch-CSI-ResourceList      SEQUENCE (SIZE (1..maxNrofBWPs))
OF PUCCH-CSI-Resource
      },
      semiPersistentOnPUCCH       SEQUENCE {
         reportSlotConfig           CSI-ReportPeriodicityAndOffset,
         pucch-CSI-ResourceList      SEQUENCE (SIZE (1..maxNrofBWPs))
OF PUCCH-CSI-Resource
      },
      semiPersistentOnPUSCH       SEQUENCE {
         reportSlotConfig           ENUMERATED {sl5, sl10, sl20, sl40, sl80,
Sl160, sl320},
```

TABLE 9-continued

| | |
|---|---|
| reportSlotOffsetList OF INTEGER(0..32), | SEQUENCE (SIZE (1..maxNrofUL-Allocations)) |
| p0alpha | P0-PUSCH-AlphaSetId |
| }, | |
| aperiodic | SEQUENCE { |
| reportSlotOffsetList INTEGER(0..32) | SEQUENCE (SIZE (1..maxNrofUL-Allocations)) OF |
| } | |
| }, | |
| reportQuantity | CHOICE { |
| none | NULL, |
| cri-RI-PMI-CQI | NULL, |
| cri-RI-i1 | NULL, |
| cri-RI-i1-CQI | SEQUENCE { |
| pdsch-BundleSizeForCSI OPTIONAL | ENUMERATED {n2, n4} |
| }, | |
| cri-RI-CQI | NULL, |
| cri-RSRP | NULL, |
| ssb-Index-RSRP | NULL, |
| cri-RI-LI-PMI-CQI | NULL |
| }, | |

In addition, the UE measures CSI based on configuration information related to the CSI (S1620).

The CSI measurement may include (1) a CSI-RS reception process (S1622) and (2) a process of computing the CSI through the received CSI-RS (S1624).

A sequence for the CSI-RS is generated by Equation 3 below and an initialization value of pseudo-random sequence C(i) is defined by Equation 4.

$$r(m) = \frac{1}{\sqrt{2}}(1 - 2 \cdot c(2m)) + j\frac{1}{\sqrt{2}}(1 - 2 \cdot c(2m+1))$$ [Equation 3]

$$c_{init} = \left(2^{10}\left(N_{symb}^{slot}n_{s,f}^{\mu} + l + 1\right)(2n_{ID} + 1) + n_{ID}\right) \bmod 2^{31}$$ [Equation 4]

In Equations 3 and 4, $n_{s,f}^{\mu}$ represents a slot number in a radio frame and pseudo-random sequence generator is initialized to Cint at a start of each OFDM symbol which is $n_{s,f}^{\mu}$.

In addition, l represents an OFDM symbol number in a slot and $n_{ID}$ is the same as higher-layer parameter scramblingID.

In addition, for the CSI-RS, resource element (RE) mapping is configured time and frequency domains by higher layer parameter CSI-RS-ResourceMapping.

Table 10 shows an example of CSI-RS-ResourceMapping IE.

TABLE 10

| | |
|---|---|
| -- ASN1START | |
| -- TAG-CSI-RS-RESOURCEMAPPING-START | |
| CSI-RS-ResourceMapping ::= | SEQUENCE { |
| frequencyDomainAllocation | CHOICE { |
| row1 | BIT STRING (SIZE (4)), |
| row2 | BIT STRING (SIZE (12)), |
| row4 | BIT STRING (SIZE (3)), |
| other | BIT STRING (SIZE (6)) |
| }, | |
| nrofPorts | ENUMERATED {p1,p2,p4,p8,p12,p16,p24,p32}, |
| firstOFDMSymbolInTimeDomain | INTEGER (0..13), |
| firstOFDMSymbolInTimeDomain2 | INTEGER (2..12) OPTIONAL, --NeedR |
| cdm-Type | ENUMERATED {noCDM, fd-CDM2, cdm4-FD2-TD2, cdm8-FD2-TD4}, |
| density | CHOICE { |
| dot5 | ENUMERATED {evenPRBs, oddPRBs}, |
| one | NULL, |
| three | NULL, |
| spare | NULL |
| }, | |
| freqBand | CSI-Frequency Occupation, |
| ... | |
| } | |

In Table 10, a density (D) represents a density of the CSI-RS resource measured in RE/port/physical resource block (PRB) and nrofPorts represents the number of antenna ports.

Further, the UE reports the measured CSI to the eNB (S12030).

Here, in the case where a quantity of CSI-ReportConfig of Table 10 is configured to 'none (or No report)', the UE may skip the report.

However, even in the case where the quantity is configured to 'none (or No report)', the UE may report the measured CSI to the eNB.

The case where the quantity is configured to 'none (or No report)' is a case of triggering aperiodic TRS or a case where repetition is configured.

Here, only in a case where the repetition is configured to 'ON', the UE may be defined to skip the report.

In summary, in the case where the repetition is configured to 'ON' and 'OFF', 'No report', 'SSB Resource Indicator (SSBRI) and L1-RSRP', and 'CSI-RS Resource Indicator (CRI) and L1-RSRP' may be all available as the CSI report.

Alternatively, in the case where the repetition is 'OFF', CSI report of 'SSBRI and L1-RSRP' or 'CRI and L1-RSRP' may be defined to be transmitted and in the case where the repetition is 'ON', 'No report', SSBRI and L1-RSRP', or 'CRT and L1-RSRP' may be defined to be transmitted.

CSI Measurement and Reporting Procedure

The NR system supports more flexible and dynamic CSI measurement and reporting.

The CSI measurement may include a procedure of acquiring the CSI by receiving the CSI-RS and computing the received CSI-RS.

As time domain behaviors of the CSI measurement and reporting, aperiodic/semi-persistent/periodic channel measurement (CM) and interference measurement (IM) are supported.

A 4 port NZP CSI-RS RE pattern is used for configuring the CSI-IM.

CSI-IM based IMR of the NR has a similar design to the CSI-IM of the LTE and is configured independently of ZP CSI-RS resources for PDSCH rate matching.

In addition, in ZP CSI-RS based IMR, each port emulates an interference layer having (a preferable channel and) precoded NZP CSI-RS.

This is for intra-cell interference measurement with respect to a multi-user case and primarily targets MU interference.

The eNB transmits the precoded NZP CSI-RS to the UE on each port of the configured NZP CSI-RS based IMR.

The UE assumes a channel/interference layer for each port and measures interference.

In respect to the channel, when there is no PMI and RI feedback, multiple resources are configured in a set and the base station or the network indicates a subset of NZP CSI-RS resources through the DCI with respect to channel/interference measurement.

Resource setting and resource setting configuration will be described in more detail.

Resource Setting

Each CSI resource setting 'CSI-ResourceConfig' includes a configuration for S≥1 CSI resource set (given by higher layer parameter csi-RS-ResourceSetList).

Here, the CSI resource setting corresponds to the CSI-RS-resourcesetlist.

Here, S represents the number of configured CSI-RS resource sets.

Here, the configuration for S≥1 CSI resource set includes each CSI resource set including CSI-RS resources (constituted by NZP CSI-RS or CSI IM) and an SS/PBCH block (SSB) resource used for L1-RSRP computation.

Each CSI resource setting is positioned in a DL BWP (bandwidth part) identified by a higher layer parameter bwp-id.

In addition, all CSI resource settings linked to CSI reporting setting have the same DL BWP.

A time domain behavior of the CSI-RS resource within the CSI resource setting included in CSI-ResourceConfig IE is indicated by higher layer parameter resourceType and may be configured to be aperiodic, periodic, or semi-persistent.

The number S of configured CSI-RS resource sets is limited to '1' with respect to periodic and semi-persistent CSI resource settings.

Periodicity and slot offset which are configured are given in numerology of associated DL BWP as given by bwp-id with respect to the periodic and semi-persistent CSI resource settings.

When the UE is configured as multiple CSI-ResourceConfigs including the same NZP CSI-RS resource ID, the same time domain behavior is configured with respect to CSI-ResourceConfig.

When the UE is configured as multiple CSI-ResourceConfigs including the same CSI-IM resource ID, the same time domain behavior is configured with respect to CSI-ResourceConfig.

Next, one or more CSI resource settings for channel measurement (CM) and interference measurement (IM) are configured through higher layer signaling.

CSI-IM resource for interference measurement.

NZP CSI-RS resource for interference measurement.

NZP CSI-RS resource for channel measurement.

That is, channel measurement resource (CMR) may be NZP CSI-RS and interference measurement resource (IMR) may be NZP CSI-RS for CSI-IM and IM.

Here, CSI-IM (or ZP CSI-RS for IM) is primarily used for inter-cell interference measurement.

In addition, NZP CSI-RS for IM is primarily used for intra-cell interference measurement from multi-users.

The UE may assume CSI-RS resource(s) for channel measurement and CSI-IM/NZP CSI-RS resource(s) for interference measurement configured for one CSI reporting are 'QCL-TypeD' for each resource.

Resource Setting Configuration

As described, the resource setting may mean a resource set list.

In each trigger state configured by using higher layer parameter CSI-AperiodicTriggerState with respect to aperiodic CSI, each CSI-ReportConfig is associated with one or multiple CSI-ReportConfigs linked to the periodic, semi-persistent, or aperiodic resource setting.

One reporting setting may be connected with a maximum of three resource settings.

When one resource setting is configured, the resource setting (given by higher layer parameter resourcesForChannelMeasurement) is used for channel measurement for L1-RSRP computation.

When two resource settings are configured, a first resource setting (given by higher layer parameter resourcesForChannelMeasurement) is used for channel measurement and a second resource setting (given by csi-IM-ResourcesForInterference or nzp-CSI-RS-ResourcesForInterference) is used for interference measurement performed on CSI-IM or NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement, and a third resource setting (given by nzp-CSI-RS-ResourcesForInterference) is for NZP CSI-RS based interference measurement.

Each CSI-ReportConfig is linked to periodic or semi-persistent resource setting with respect to semi-persistent or periodic CSI.

When one resource setting (given by resourcesForChannelMeasurement) is configured, the resource setting is used for channel measurement for L1-RSRP computation.

When two resource settings are configured, a first resource setting (given by resourcesForChannelMeasurement) is used for channel measurement and a second resource setting (given by higher layer parameter csi-IM-ResourcesForInterference) is used for interference measurement performed on CSI-IM.

CSI measurement related CSI computation will be described.

When interference measurement is performed on CSI-IM, each CSI-RS resource for channel measurement is associated with the CSI-IM resource for each resource by an order of CSI-RS resources and CSI-IM resources within a corresponding resource set.

The number of CSI-RS resources for channel measurement is equal to the number of CSI-IM resources.

In addition, when the interference measurement is performed in the NZP CSI-RS, the UE does not expect to be configured as one or more NZP CSI-RS resources in the associated resource set within the resource setting for channel measurement.

A UE in which Higher layer parameter nzp-CSI-RS-ResourcesForInterference is configured does not expect that 18 or more NZP CSI-RS ports will be configured in the NZP CSI-RS resource set.

For CSI measurement, the UE assumes the followings.

Each NZP CSI-RS port configured for interference measurement corresponds to an interference transport layer.

In all interference transport layers of the NZP CSI-RS port for interference measurement, an energy per resource element (EPRE) ratio is considered.

Different interference signals on RE(s) of the NZP CSI-RS resource for channel measurement, the NZP CSI-RS resource for interference measurement, or CSI-IM resource for interference measurement.

A CSI reporting procedure will be described in more detail.

For CSI reporting, time and frequency resources which may be used by the UE are controlled by the eNB.

The channel state information (CSI) may include at least one of a channel quality indicator (CQI), a precoding matrix indicator (PMI), a CSI-RS resource indicator (CRI), an SS/PBCH block resource indicator (SSBRI), a layer indicator (LI), a rank indicator (RI), and L1-RSRP.

For the CQI, PMI, CRI, SSBRI, LI, RI, and L1-RSRP, the UE is configured by a higher layer as N≥1 CSI-ReportConfig reporting setting, M≥1 CSI-ResourceConfig resource setting, and a list (provided by aperiodicTriggerStateList and semiPersistentOnPUSCH) of one or two trigger states.

In the aperiodicTriggerStateList, each trigger state includes the channel and an associated CSI-ReportConfigs list optionally indicating resource set IDs for interference.

In the semiPersistentOnPUSCH-TriggerStateList, each trigger state includes one associated CSI-ReportConfig.

In addition, the time domain behavior of CSI reporting supports periodic, semi-persistent, and aperiodic.

Hereinafter, each of periodic, semi-persistent (SP), and aperiodic CSI reporting will be described.

The periodic CSI reporting is performed on short PUCCH and long PUCCH.

The periodicity and slot offset of the periodic CSI reporting may be configured through RRC and refer to the CSI-ReportConfig IE.

Next, SP CSI reporting is performed on short PUCCH, long PUCCH, or PUSCH.

In the case of SP CSI on the short/long PUCCH, the periodicity and the slot offset are configured as the RRC and the CSI reporting to separate MAC CE is activated/deactivated.

In the case of the SP CSI on the PUSCH, the periodicity of the SP CSI reporting is configured through the RRC, but the slot offset is not configured through the RRC and the SP CSI reporting is activated/deactivated by DCI (format 0_1).

An initial CSI reporting timing follows a PUSCH time domain allocation value indicated in the DCI and a subsequent CSI reporting timing follows a periodicity configured through the RRC.

Separated RNTI (SP-CSI C-RNTI) is used with respect to the SP CSI reporting on the PUSCH.

DCI format 0_1 may include a CSI request field and may activate/deactivate a specific configured SP-CSI trigger state.

In addition, the SP CSI reporting has the same or similar activation/deactivation as a mechanism having data transmission on SPS PUSCH.

Next, the aperiodic CSI reporting is performed on the PUSCH and is triggered by the DCI.

In the case of AP CSI having AP CSI-RS, an AP CSI-RS timing is configured by the RRC.

Here, a timing for the AP CSI reporting is dynamically controlled by the DCI.

The NR does not adopt a scheme (for example, transmitting RI, WB PMI/CQI, and SB PMI/CQI in order) of dividing and reporting the CSI in multiple reporting instances applied to PUCCH based CSI reporting in the LTE.

Instead, the NR restricts specific CSI reporting not to be configured in the short/long PUCCH and a CSI omission rule is defined.

In addition, in relation with the AP CSI reporting timing, a PUSCH symbol/slot location is dynamically indicated by the DCI. In addition, candidate slot offsets are configured by the RRC.

For the CSI reporting, slot offset(Y) is configured for each reporting setting.

For UL-SCH, slot offset K2 is configured separately.

Two CSI latency classes (low latency class and high latency class) are defined in terms of CSI computation complexity.

The low latency CSI is a WB CSI that includes up to 4 ports Type-I codebook or up to 4-ports non-PMI feedback CSI.

The high latency CSI refers to CSI other than the low latency CSI.

For a normal UE, (Z, Z') is defined in a unit of OFDM symbols.

Z represents a minimum CSI processing time from the reception of the aperiodic CSI triggering DCI to the execution of the CSI reporting.

Z' represents a minimum CSI processing time from the reception of the CSI-RS for channel/interference to the execution of the CSI reporting.

Additionally, the UE reports the number of CSIs which may be simultaneously calculated.

Figure 17:
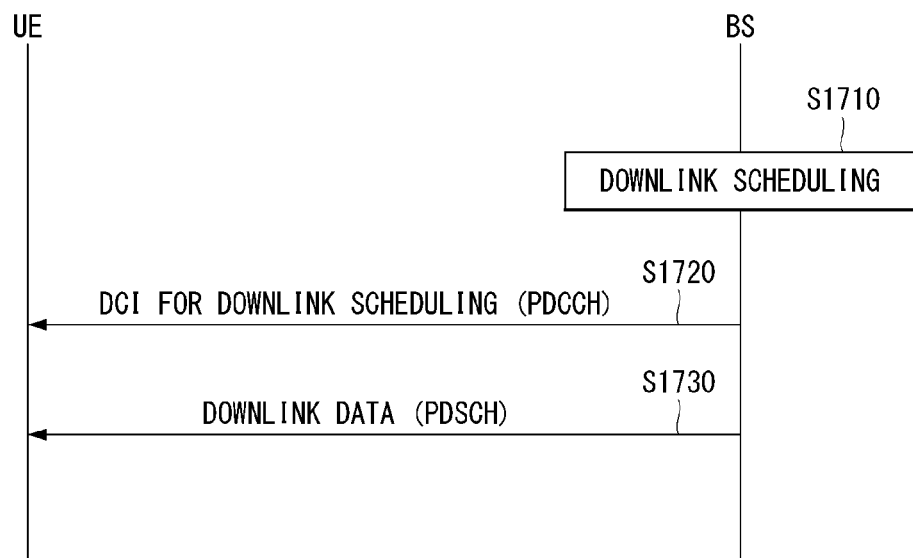
FIG. 17 is a flowchart showing an example of a downlink transmission/reception operation to which a method proposed in the present disclosure may be applied.

FIG. 17 is a flowchart showing an example of a downlink transmission/reception operation to which a method proposed in the present disclosure may be applied.

The eNB schedules downlink transmission such as a frequency/time resource, a transport layer, a donwlink precoder, MCS, etc., (S1710). In particular, the eNB may determine a beam for PDSCH transmission to the UE through the aforementioned operations.

The UE receives Downlink Control Information (DCI) for downlink scheduling (i.e., including scheduling information of the PDSCH) on the PDCCH (S1720).

DCI format 1_0 or 1_1 may be used for the downlink scheduling and in particular, DCI format 1_1 includes the following information which includes: Identifier for DCI formats, Bandwidth part indicator, Frequency domain resource assignment, Time domain resource assignment, PRB bundling size indicator, Rate matching indicator, ZP CSI-RS trigger, Antenna port(s), Transmission configuration indication (TCI), SRS request, and Demodulation Reference Signal (DMRS) sequence initialization In particular, according to each state indicated in an antenna port(s) field, the number of DMRS ports may be scheduled and Single-user (SU)/Multi-user (MU) transmission scheduling is also available.

Further, a TCI field is configured by 3 bits and a maximum of 8 TCI states are indicated according to a TCI field value to dynamically the QCL for the DMRS.

The UE receives downlink data from the eNB on the PDSCH (S1730).

When the UE detects a PDCCH including DCI format 1_0 or 1_1, the UE decodes the PDSCH according to the indication by the corresponding DCI.

Here, when the UE receives a PDSCH scheduled by DCI format 1, a DMRS configuration type may be configured by higher layer parameter 'dmrs-Type' in the UE and the DMRS type is used for receiving the PDSCH. Further, in the UE, the maximum number of front-loaded DMRS symbols for the PDSCH may be configured by higher layer parameter 'maxLength'.

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE.

Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not associated with PDSCH transmission to another UE.

When the UE receives the PDSCH, a precoding granularity P' may be assumed as a consecutive resource block in the frequency domain. Here, P' may correspond to one value of {2, 4, and wideband}.

When P' is determined as wideband, the UE does not predict that the PDSCH is scheduled to non-contiguous PRBs and the UE may assume that the same precoding is applied to the allocated resource.

On the contrary, when P' is determined as any one of {2 and 4}, a Precoding Resource Block Group (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE first reads a 5-bit MCD field in the DCI and determines the modulation order and the target code rate. In addition, the UE reads a redundancy version field in the DCI and determines a redundancy version. In addition, the UE determines the transport block size by using the number of layers before rate matching and the total number of allocated PRBs.

Figure 18:
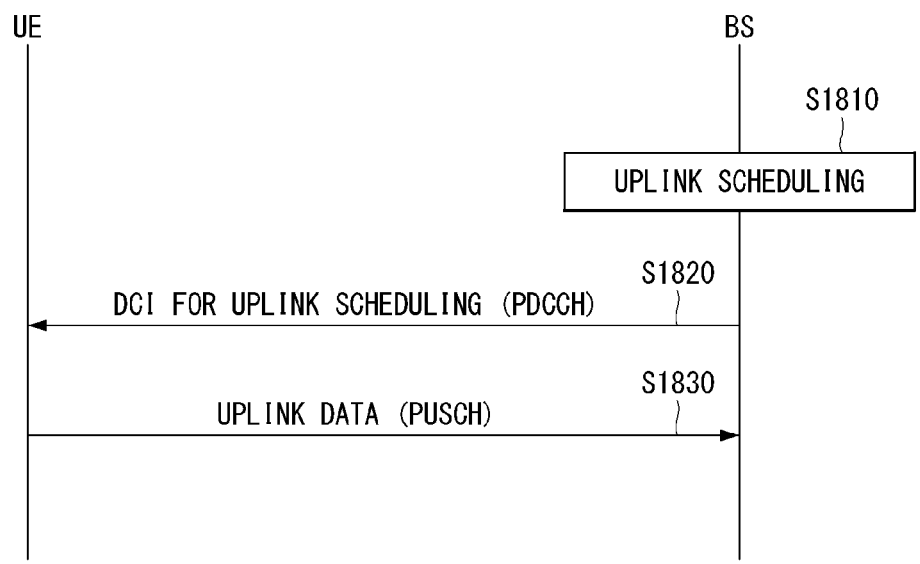
FIG. 18 is a flowchart showing an example of an uplink transmission/reception operation to which a method proposed in the present disclosure may be applied.

FIG. 18 is a flowchart showing an example of an uplink transmission/reception operation to which a method proposed in the present disclosure may be applied.

The eNB schedules uplink transmission such as the frequency/time resource, the transport layer, an uplink precoder, the MCS, etc., (S1810). In particular, the eNB may determine a beam for PUSCH transmission of the UE through the aforementioned operations.

The UE receives DCI for downlink scheduling (i.e., including scheduling information of the PUSCH) on the PDCCH (S1820).

DCI format 0_0 or 0_1 may be used for the uplink scheduling and in particular, DCI format 0_1 includes the following information: Identifier for DCI formats), UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator In particular, configured SRS resources in an SRS resource set associated with higher layer parameter 'usage' may be indicated by an SRS resource indicator field. Further, 'spatialRelationInfo' may be configured for each SRS resource and a value of 'spatialRelationInfo' may be one of {CRI, SSB, and SRI}.

The UE transmits the uplink data to the eNB on the PUSCH (S1830).

When the UE detects a PDCCH including DCI format 0_0 or 0_1, the UE transmits the corresponding PUSCH according to the indication by the corresponding DCI.

Two transmission schemes, i.e., codebook based transmission and non-codebook based transmission are supported for PUSCH transmission:

i) When higher layer parameter txConfig' is set to 'codebook', the UE is configured to the codebook based transmission. On the contrary, when higher layer parameter txConfig' is set to 'nonCodebook', the UE is configured to the non-codebook based transmission. When higher layer parameter 'txConfig' is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI. Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter 'nrofSRS-Ports'. When the UE is set to higher layer parameter 'txConfig' set to 'codebook', at least one SRS resource is configured in the UE. An SRI indicated in slot n is associated with most recent transmission of the SRS resource identified by the SRI and here, the SRS resource precedes PDCCH (i.e., slot n) carrying the SRI.

Cell Search

The cell search refers to a process of acquiring time/frequency synchronization of the cell and detecting a cell identifier (ID) (e.g., physical layer cell ID (PCID)) of the cell by the UE. The PSS is used to detect the cell ID within a cell ID group and the SSS is used to detect the cell ID group. The PBCH is used for SSB (time) index detection and half-frame detection.

A cell search process of the UE may be organized as shown in Table 11 below.

TABLE 11

| | Type of Signals | Operations |
|---|---|---|
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |
| 5th Step | PDCCH and PDSCH | Cell access information RACH configuration | ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter 'srs-ResourceIndicator'. The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter 'usage' set to 'nonCodebook'. The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Initial Access (IA) Procedure

Synchronization Signal Block (SSB) Transmission and Related Operation

Figure 19:
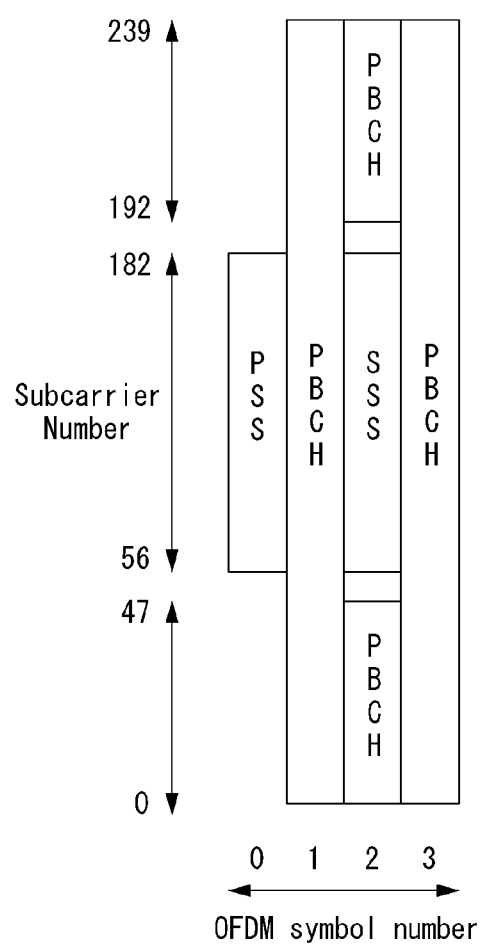
FIG. 19 illustrates an SSB architecture.

FIG. 19 illustrates a SSB architecture. The UE may perform cell search, system information acquisition, beam alignment for initial access, DL measurement, etc., based on an SSB. The SSB is mixedly used with an SS/Synchronization Signal/Physical Broadcast channel (PBCH) block.

Referring to FIG. 19, the SSB is constituted by PSS, SSS, and PBCH. The SSB is constituted by four continuous OFDM symbols and the PSS, the PBCH, the SSS/PBCH, and the PBCH are transmitted for each OFDM symbol. Each of the PSS and the SSS may be constituted by one OFDM symbol and 127 subcarriers and the PBCH is constituted by 3 OFDM symbols and 576 subcarriers. Polar coding and quadrature phase shift keying (QPSK) are applied to the PBCH. The PBCH is constituted by a data RE and a demodulation reference signal (DMRS) RE for each OFDM symbol. Three DMRS REs exist for each RB, and three data REs exist between DMRS REs.

There are 336 cell ID groups, and three cell IDs exist for each cell ID group. There are a total of 1008 cell IDs.

Figure 20:
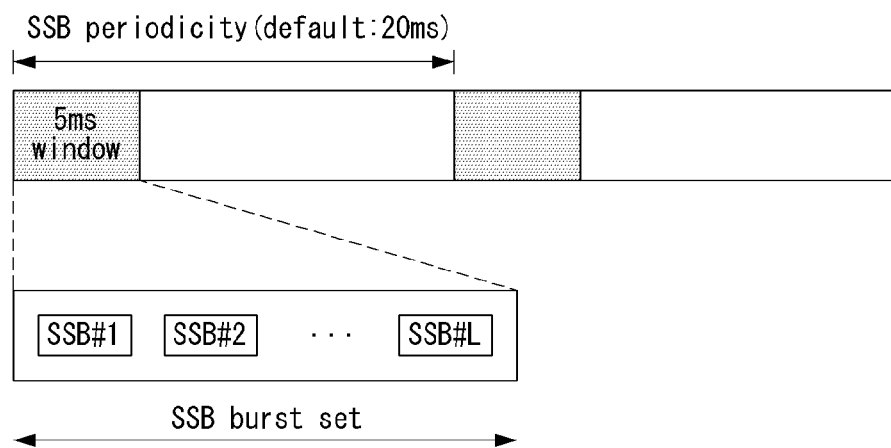
FIG. 20 illustrates SSB transmission.

FIG. 20 illustrates SSB transmission.

Referring to FIG. 20, the SSB is periodically transmitted according to an SSB periodicity. An SSB basic periodicity assumed by the UE in initial cell search is defined as 20 ms. After cell access, the SSB periodicity may be configured by one of {5 ms, 10 ms, 20 ms, 40 ms, 80 ms, 160 ms} by the network (e.g., eNB). At a beginning part of the SSB periodicity, a set of SSB bursts is configured. The SSB burst set may be configured by a 5-ms time window (i.e., half-frame) and the SSB may be transmitted up to L times within the SS burst set. L which is the maximum number of transmissions of the SSB may be given as follows according to a frequency band of a carrier. One slot includes up to two SSBs.

Figure 21:
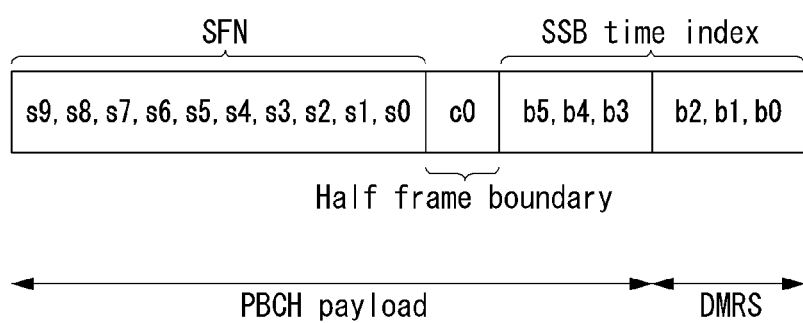
FIG. 21 illustrates that a UE acquires information on DL time synchronization.

FIG. 21 illustrates that a UE acquires information on DL time synchronization.

The UE may acquire DL synchronization by detecting the SSB. The UE may identify the structure of the SSB burst set based on the detected SSB index, and thus detect a symbol/slot/half-frame boundary. The number of the frame/half-frame to which the detected SSB belongs may be identified using SFN information and half-frame indication information.

Specifically, the UE may acquire 10-bit System Frame Number (SFN) information from the PBCH (s0 to s9). 6 bits of the 10-bit SFN information are obtained from a Master Information Block (MIB), and the remaining 4 bits are obtained from a PBCH Transport Block (TB).

Next, the UE may acquire 1-bit half-frame indication information (c0). When a carrier frequency is 3 GHz or less, the half-frame indication information may be implicitly signaled using PBCH DMRS. The PBCH DMRS indicates 3-bit information by using one of eight PBCH DMRS sequences. Accordingly, in the case of L=4, 1 bit which remains after indicating the SSB index among 3 bits which may be indicated by using eight PBCH DRMS sequences may be used for half frame indication.

Last, the UE may acquire the SSB index based on a DMRS sequence and a PBCH payload. SSB candidates are indexed from 0 to L−1 in chronological order within the SSB burst set (i.e., half-frame). In the case of L=8 or 64, Least Significant Bit (LSB) 3 bits of the SSB index may be indicated using eight different PBCH DMRS sequences (b0 to b2). In the case of L=64, Most Significant Bit (MSB) 3 bits of the SSB index are indicated through the PBCH (b3 to b5). In the case of L=2, LSB 2 bits of the SSB index may be indicated using four different PBCH DMRS sequences (b0 and b1). In the case of L=4, 1 bit which remain after indicating the SSB index among 3 bits which may be indicated by using eight PBCH DRMS sequences may be used for the half frame indication (b2).

System Information Acquisition

Figure 22:
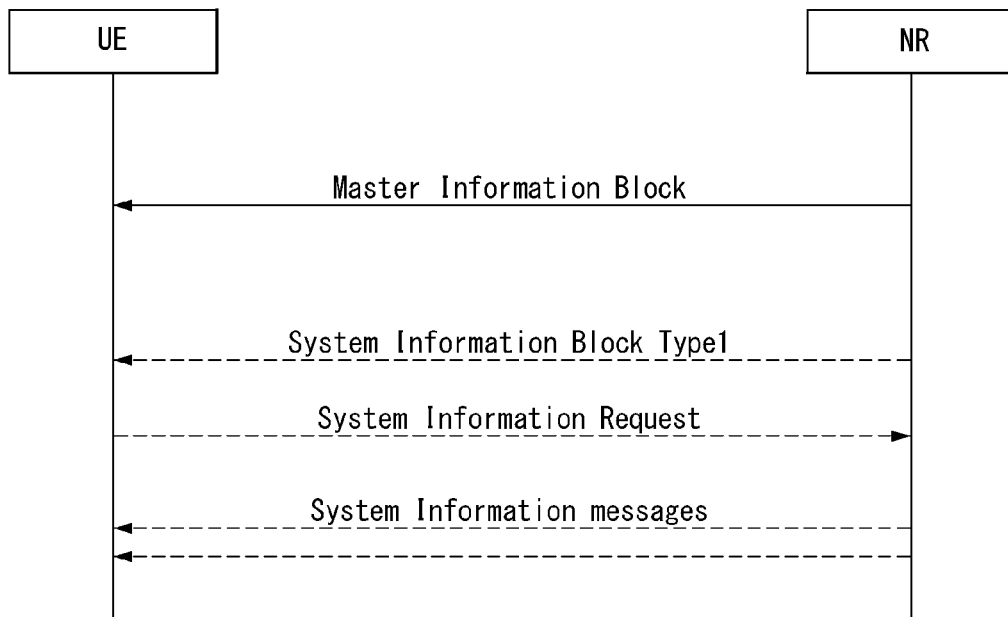
FIG. 22 illustrates a system information (SI) acquisition process.

FIG. 22 illustrates a system information (SI) acquisition process. The UE may acquire AS-/NAS-information through an SI acquisition process. The SI acquisition process may be applied to UEs which are in an RRC_IDLE state, an RRC_INACTIVE state, an RRC_CONNECTED state.

The SI is divided into a master information block (MIB) and a plurality of system information blocks (SIB). SI other than the MIB may be referred to as Remaining Minimum System Information (RSI). The following may be referred to for details.

The MIB includes information/parameters related to SystemInformationBlock1 (SIB1) reception and is transmitted through the PBCH of the SSB. In initial cell selection, the UE assumes that the half frame with the SSB is repeated with a periodicity of 20 ms. The UE may check whether a Control Resource Set (CORESET) for a Type0-PDCCH common search space exists based on the MIB. The Type0-PDCCH common search space is a kind of PDCCH search space and is used to transmit a PDCCH for scheduling an SI message. If there is the Type0-PDCCH common search space, the UE may (i) a plurality of continuous RBs and one or more continuous symbols constituting the CORESET and (ii) a PDCCH occasion (i.e., a time domain location for receiving the PDCCH) based on information (e.g., pdcch-ConfigSIB1) in the MIB. If there is no Type0-PDCCH common search space, pdcch-ConfigSIB1 provides information on a frequency location where SSB/SIB1 exists and a frequency range where the SSB/SIB1 does not exist.

The SIB1 contains information related to the availability and scheduling (e.g., transmission periodicity, SI-window size) of the remaining SIBs (hereinafter, referred to as SIBx, x is an integer of 2 or more). For example, the SIB1 may inform whether the SIBx is periodically broadcasted or whether the SIBx is provided by a request of the UE according to an on-demand scheme. When the SIBx is provided by the on-demand scheme, the SIB1 may include information which the UE requires for performing an SI request. The SIB1 is transmitted through the PDSCH, the PDCCH for scheduling the SIB1 is transmitted through the Type0-PDCCH common search space, and the SIB1 is transmitted through the PDSCH indicated by the PDCCH.

The SIBx is included in the SI message and transmitted through the PDSCH. Each SI message is transmitted within a time window (i.e., SI-window) which periodically occurs.

Random Access Procedure

Figure 23:
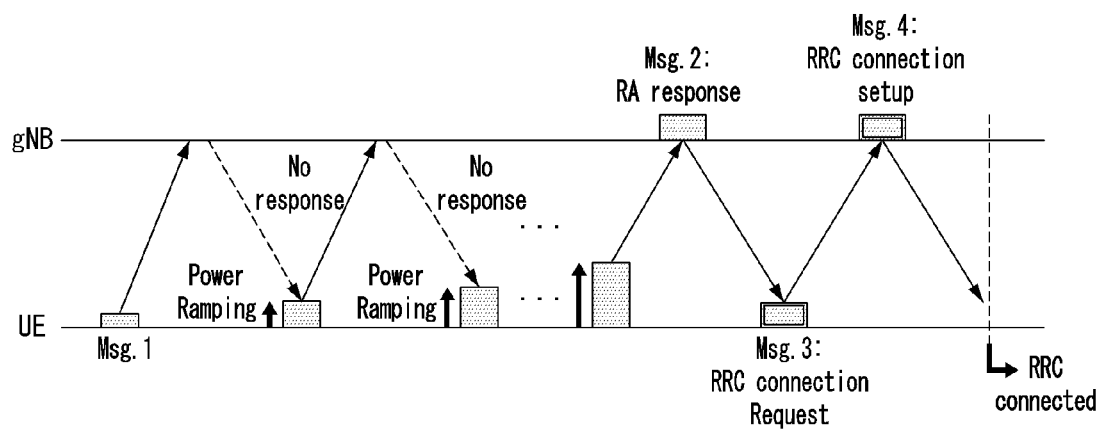
FIG. 23 illustrates an example of a random access procedure.

The random access procedure of the UE may be summarized as shown in Table 12 and FIG. 23.

TABLE 12

| | Type of Signals | Acquired operation/information |
|---|---|---|
| 1st step | PRACH preamble in UL | Initial beam acquisition<br>Random selection of RA-preamble ID |
| 2nd Step | Random access response on DL-SCH | Timing alignment information<br>RA-preamble ID<br>Initial UL grant, temporary C-RNTI |
| 3rd Step | UL transmission on UL-SCH | RRC connection request<br>UE identifier |
| 4th Step | Contention Resolution on DL | Temporary C-RNTI on PDCCH for initial access<br>C-RNTI on PDCCH for UE IN RRC_CONNECTED |

FIG. 23 illustrates an example of a random access procedure.

First, the UE may transmit a PRACH preamble as Msg1 of a random access procedure in UL.

Random access preamble sequences having two different lengths are supported. Long sequence length 839 is applied as subcarrier spacing of 1.25 and 5 kHz, and short sequence length 139 is applied as subcarrier spacing of 15, 30, 60 and 120 kHz. Long sequences support both unrestricted sets and restricted sets of type A and type B, while short sequences support only unrestricted sets.

Multiple RACH preamble formats are defined with one or more RACH OFDM symbols, different cyclic prefixes, and guard time. A PRACH preamble configuration for use is provided to the UE in the system information.

If there is no response to Msg1, the UE may retransmit the PRACH preamble within a predetermined number of times by power ramping. The UE calculates PRACH transmission power for retransmission of the preamble based on the most recent pathloss and power ramping counter. When the terminal performs beam switching, the counter of power ramping remains unchanged.

The system information informs the UE of an association between the SS block and the RACH resource.

Figure 24:
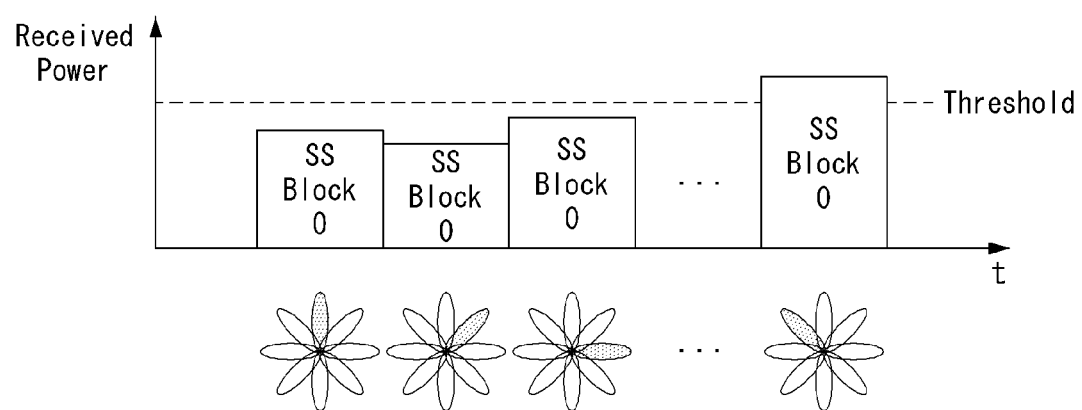
FIG. 24 illustrates a concept of a threshold for an SS block for RACH resource association.

FIG. 24 illustrates a concept of a threshold for an SS block for RACH resource association.

A threshold of the SS block for RACH resource association is based on RSRP and a configurable network. Transmission or retransmission of the RACH preamble is based on SS blocks that meet the threshold.

When the UE receives a random access response on the DL-SCH, the DL-SCH may provide timing alignment information, RA-preamble ID, initial UL grant, and temporary C-RNTI.

Based on this information, the UE may transmit the UL transmission on the UL-SCH as Msg3 of the random access procedure. The Msg3 may include the RRC connection request and the UE identifier.

In response thereto, the network may transmit Msg4 and the Msg4 may be handled as a contention resolution message in DL. By receiving the Msg4, the UE may enter the RRC connected state.

Precoding

Block vectors $[y^{(0)}(i) \ldots y^{(u-1)}(i)]^T$, i=0, 1, ..., $M_{symb}^{layer}-1$ may be precoded according to Equation 5 below.

$$\begin{bmatrix} z^{(p_0)}(i) \\ \vdots \\ z^{(p_{\rho-1})}(i) \end{bmatrix} = W \begin{bmatrix} y^{(0)}(i) \\ y^{(u-1)}(i) \end{bmatrix} \quad \text{[Equation 5]}$$

In Equation 5, i=0, 1, . . . , $M_{symb}^{ap}-1$, $M_{symb}^{ap}=M_{symb}^{layer}$. A set $\{p_0, \ldots, p_{\rho-1}\}$ of antenna ports may be determined according to a procedure related to the PUSCH.

In the non-codebook based transmission, precoding matrix W is the same as an identity matrix. In the codebook based transmission, precoding matrix W may be given by W=1 for single layer transmission in a single antenna port, otherwise, precoding matrix W may be given by Tables 11 to 17 or a procedure related to the PUSCH for the transmit precoding matrix indicator (TPMI) acquired from the DCI for scheduling the uplink transmission.

When higher layer parameter txConfig is not configured, precoding matrix W may be 1.

Table 13 below shows an example of precoding matrix for single layer transmission using two antenna ports.

TABLE 13

| TPMI index | W (ordered from left to right in increasing order of TPMI index) |
|---|---|
| 0-5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Table 14 below shows an example of precoding matrix for single layer transmission using four antenna ports in which transform precoding is activated.

TABLE 14

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

Table 15 below shows an example of precoding matrix for single layer transmission using four antenna ports in which transform precoding is deactivated.

TABLE 15

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |

TABLE 15-continued

| TPMI index | W (ordered from left to right in increasing order of TPMI index) |
|---|---|
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

Table 16 below shows an example of precoding matrix for two layer transmission using two antenna ports in which transform precoding is deactivated.

TABLE 16

| TPMI index | W (ordered from left to right in increasing order of TPMI index) |
|---|---|
| 0-2 | $\frac{1}{\sqrt{2}}\begin{bmatrix}1 & 0\\0 & 1\end{bmatrix}$ $\frac{1}{2}\begin{bmatrix}1 & 1\\1 & -1\end{bmatrix}$ $\frac{1}{2}\begin{bmatrix}1 & 1\\j & -j\end{bmatrix}$ |

Table 17 below shows an example of precoding matrix for two layer transmission using four antenna ports in which transform precoding is deactivated.

TABLE 17

| TPMI index | W (ordered from left to right in increasing order of TPMI index) |
|---|---|
| 0-3 | $\frac{1}{2}\begin{bmatrix}1 & 0\\0 & 1\\0 & 0\\0 & 0\end{bmatrix}$ $\frac{1}{2}\begin{bmatrix}1 & 0\\0 & 0\\0 & 1\\0 & 0\end{bmatrix}$ $\frac{1}{2}\begin{bmatrix}1 & 0\\0 & 0\\0 & 0\\0 & 1\end{bmatrix}$ $\frac{1}{2}\begin{bmatrix}0 & 0\\1 & 0\\0 & 1\\0 & 0\end{bmatrix}$ |
| 4-7 | $\frac{1}{2}\begin{bmatrix}0 & 0\\1 & 0\\0 & 0\\0 & 1\end{bmatrix}$ $\frac{1}{2}\begin{bmatrix}0 & 0\\0 & 0\\1 & 0\\0 & 1\end{bmatrix}$ $\frac{1}{2}\begin{bmatrix}1 & 0\\0 & 1\\1 & 0\\0 & -j\end{bmatrix}$ $\frac{1}{2}\begin{bmatrix}1 & 0\\0 & 1\\1 & 0\\0 & j\end{bmatrix}$ |
| 8-11 | $\frac{1}{2}\begin{bmatrix}1 & 0\\0 & 1\\-j & 0\\0 & 1\end{bmatrix}$ $\frac{1}{2}\begin{bmatrix}1 & 0\\0 & 1\\-j & 0\\0 & -1\end{bmatrix}$ $\frac{1}{2}\begin{bmatrix}1 & 0\\0 & 1\\-1 & 0\\0 & -j\end{bmatrix}$ $\frac{1}{2}\begin{bmatrix}1 & 0\\0 & 1\\-1 & 0\\0 & j\end{bmatrix}$ |
| 12-15 | $\frac{1}{2}\begin{bmatrix}1 & 0\\0 & 1\\j & 0\\0 & 1\end{bmatrix}$ $\frac{1}{2}\begin{bmatrix}1 & 0\\0 & 1\\j & 0\\0 & -1\end{bmatrix}$ $\frac{1}{2\sqrt{2}}\begin{bmatrix}1 & 1\\1 & 1\\1 & -1\\1 & -1\end{bmatrix}$ $\frac{1}{2\sqrt{2}}\begin{bmatrix}1 & 1\\1 & 1\\j & -j\\j & -j\end{bmatrix}$ |
| 16-19 | $\frac{1}{2\sqrt{2}}\begin{bmatrix}1 & 1\\j & j\\1 & -1\\j & -j\end{bmatrix}$ $\frac{1}{2\sqrt{2}}\begin{bmatrix}1 & 1\\j & j\\j & -j\\-1 & 1\end{bmatrix}$ $\frac{1}{2\sqrt{2}}\begin{bmatrix}1 & 1\\-1 & -1\\1 & -1\\-1 & 1\end{bmatrix}$ $\frac{1}{2\sqrt{2}}\begin{bmatrix}1 & 1\\-1 & -1\\j & -j\\-j & j\end{bmatrix}$ |
| 20-21 | $\frac{1}{2\sqrt{2}}\begin{bmatrix}1 & 1\\-j & -j\\1 & -1\\-j & j\end{bmatrix}$ $\frac{1}{2\sqrt{2}}\begin{bmatrix}1 & 1\\-j & -j\\j & -j\\1 & -1\end{bmatrix}$ — — |

Table 18 below shows an example of precoding matrix for three layer transmission using four antenna ports in which transform precoding is deactivated.

TABLE 18

| TPMI index | W (ordered from left to right in increasing order of TPMI index) | | | |
|---|---|---|---|---|
| 0-3 | $\frac{1}{2}\begin{bmatrix}1&0&0\\0&1&0\\0&0&1\\0&0&0\end{bmatrix}$ | $\frac{1}{2}\begin{bmatrix}1&0&0\\0&1&0\\1&0&0\\0&0&1\end{bmatrix}$ | $\frac{1}{2}\begin{bmatrix}1&0&0\\0&1&0\\-1&0&0\\0&0&1\end{bmatrix}$ | $\frac{1}{2\sqrt{3}}\begin{bmatrix}1&1&1\\1&-1&1\\1&1&-1\\1&-1&-1\end{bmatrix}$ |
| 4-6 | $\frac{1}{2\sqrt{3}}\begin{bmatrix}1&1&1\\1&-1&1\\j&j&-j\\j&-j&-j\end{bmatrix}$ | $\frac{1}{2\sqrt{3}}\begin{bmatrix}1&1&1\\-1&1&-1\\1&1&-1\\-1&1&1\end{bmatrix}$ | $\frac{1}{2\sqrt{3}}\begin{bmatrix}1&1&1\\-1&1&-1\\j&j&-j\\-j&j&j\end{bmatrix}$ | — |

Table 19 below shows an example of precoding matrix for four layer transmission using four antenna ports in which transform precoding is deactivated.

TABLE 19

| TPMI index | W (ordered from left to right in increasing order of TPMI index) | | | |
|---|---|---|---|---|
| 0-3 | $\frac{1}{2}\begin{bmatrix}1&0&0&0\\0&1&0&0\\0&0&1&0\\0&0&0&1\end{bmatrix}$ | $\frac{1}{2\sqrt{2}}\begin{bmatrix}1&1&0&0\\0&0&1&1\\1&-1&0&0\\0&0&1&-1\end{bmatrix}$ | $\frac{1}{2\sqrt{2}}\begin{bmatrix}1&1&0&0\\0&0&1&1\\j&-j&0&0\\0&0&j&-j\end{bmatrix}$ | $\frac{1}{4}\begin{bmatrix}1&1&1&1\\1&-1&1&-1\\1&1&-1&-1\\1&-1&-1&1\end{bmatrix}$ |
| 4 | $\frac{1}{4}\begin{bmatrix}1&1&1&1\\1&-1&1&-1\\j&j&-j&-j\\j&-j&-j&j\end{bmatrix}$ | — | — | — |

Power Control (PC)

In the wireless communication system, transmission power of the terminal (e.g., user equipment (UE) and/or a mobile device may be required to increase or decrease according to a situation. As such, controlling the transmission power of the UE and/or the mobile device may be referred to as uplink power control. As an example, a transmission power control scheme may be applied to satisfy a requirement (e.g., Signal-to-Noise Ratio (SNR), Bit Error Ratio (BER), Block Error Ratio (BLER), etc.) in a base station (e.g., gNB, eNB, etc.).

The power control described above may be performed by an open-loop power control scheme and a closed-loop power control scheme.

Specifically, the open-loop power control scheme means a scheme of controlling the transmission power without a feedback from a transmitting device (e.g., the eNB, etc.) to a receiving device (e.g., UE, etc.) and/or a feedback from the receiving device to the transmitting device. As an example, the UE may receive a pilot channel/signal from the eNB and estimate a strength of reception power by using the received pilot channel/signal. Thereafter, the UE may control the transmission power by using the estimated strength of the reception power.

In contrast, the closed-loop power control scheme means a scheme of controlling the transmission power based on the feedback from the transmitting device to the receiving device and/or the feedback from the receiving device to the transmitting device. As an example, the eNB receives the pilot channel/signal from the UE and determines an optimum power level of the UE based on a power level, SNR, BEER, BLER, etc., measured by the received pilot channel/signal. The eNB may transfer information (i.e., feedback) on the determined optimum power level to the UE through a control channel and the corresponding UE may control the transmission power by using the feedback provided by the eNB.

Hereinafter, a power control scheme for cases where the UE and/or the mobile device performs uplink transmission to the eNB in the wireless communication system will be described in detail.

Specifically, hereinafter, power control schemes for transmission of 1) uplink data channel (e.g., Physical Uplink Shared Channel (PUSCH), 2) uplink control channel (e.g., Physical Uplink Control Channel (PUCCH), 3) Sounding Reference Signal (SRS), and 4) random access channel (e.g., Physical Random Access Channel (PRACH) will be described. In this case, a transmission occasion (i.e., transmission time unit) (i) for PUSCH, PUCCH, SRS, and/or PRACH may be defined by slot index n_s in a frame in of a system frame number (SFN), a first symbol S in the slot, the number L of consecutive symbols, etc.

Power Control of Uplink Data Channel

Hereinafter, for convenience of description, the power control scheme will be described based on the case where the UE performs PUSCH transmission. The corresponding scheme may be extensively applied to another uplink data channel supported in the wireless communication system, of course.

In PUSCH transmission in an active uplink UL bandwidth part (UL BWP) of carrier f of serving cell c, the UE may calculate a linear power value of the transmission power determined by Equation P1 below. Thereafter, the corresponding UE may control the transmission power by considering the calculated linear power value, the number of antenna ports, and/or the number of SRS ports.

Specifically, when the UE performs PUSCH transmission in active UL BWP(b) of carrier f of serving cell c using a parameter set configuration based on index j and a PUSCH power control adjustment state based on index l, the UE may determine PUSCH transmission power $P_{PUSCH,b,f,c}(i,j,q_d,l)$ (dBm) in PUSCH transmission occasion i based on Equation 6 below.

[Equation 6]

$$P_{PUSCH,b,f,c}(i, j, q_d, l) =$$

$$\min \begin{Bmatrix} P_{CMAX,f,c}(i), \\ P_{O\_PUSCH,b,f,c}(j) + 10 \; \log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{Bmatrix}$$

[dBm]

In Equation 6, index j represents an index for an open-loop power control parameter (e.g., Po, alpha (α), etc.) and a maximum of 32 parameter sets per cell may be configured. Index q_d represents an index of a DL RS resource for pathloss (PL) measurement (e.g., $PL_{b,f,c}(q_d)$) and a maximum of four measurement values per cell may be configured. Index l represents an index for a closed-loop power control process and a maximum of two processes per cell may be configured.

Specifically, Po (e.g., $P_{O\_PUSCH,b,f,c}(j)$) as a parameter broadcasted to a part of system information may represent target reception power at a receiver. The corresponding Po value may be configured by considering a throughput of the UE, a capacity of the cell, noise, and/or interference. Further, an alpha (e.g., $\alpha_{b,f,c}(j)$) may represent a ratio of performing compensation for pathloss. The alpha may be configured to a value of 0 to 1 and full pathloss compensation or fractional pathloss compensation may be performed according to the configured value. In this case, the alpha value may be configured interference between the UEs and/or a data speed. Further, $P_{CMAX,f,c}(i)$ may represent configured UE transmit power. As an example, the configured UE transmit power may be construed as 'configured maximum UE output power' defined in 3GPP TS 38.101-1 and/or TS38.101-2. Further, $M_{RB,b,f,c}^{PUSCH}(i)$ may represent a bandwidth of PUSCH resource allocation expressed as the number of resource blocks (RBs) for the PUSCH transmission occasion based on subcarrier spacing μ. Further, $f_{b,f,c}(i,l)$ related to the PUSCH power control adjustment state may be configured or indicated based on a TPC command field of DCI (e.g., DCI format 0_0, DCI format 0_1, DCI format 2_2, DCI format 2_3, etc.).

In this case, a specific Radio Resource Control (RRC) parameter (e.g., SRI-PUSCHPowerControl-Mapping, etc.) may represent a linkage between the SRS Resource Indicator (SRI) field of downlink control information (DCI) and the indexes j, q_d, and l. In other words, the indexes j, l, and q_d may be associated with a beam, a panel, and/or a spatial domain transmission filter based on specific information. Therefore, beam, panel. And/or spatial domain transmission filter unit PUSCH transmission power control may be performed.

Parameters and/or information for the PUSCH power control may be individually (i.e., independently) configured for each BWP. In this case, the parameters and/or information may be configured or indicated through higher layer signaling (e.g., RRC signaling, Medium Access Control-Control Element (MAC-CE), etc.) and/or DCI. As an example, the parameter and/or information for the PUSCH power control may be transferred through RRC signaling PUSCH-ConfigCommon, PUSCH-PowerControl, etc., and PUSCH-ConfigCommon and PUSCH-PowerControl may be configured as shown in Table 20 below.

TABLE 20

| | |
|---|---|
| PUSCH-ConfigCommon ::= | SEQUENCE { |
| groupHoppingEnabledTransformPrecoding | ENUMERATED {enabled} |
| pusch-TimeDomainAllocationList | PUSCH-TimeDomainResourceAllocationList |
| msg3-DeltaPreamble | INTEGER (−1.. 6) |
| p0-NominalWithGrant | INTEGER (−202..24) |
| ... | |
| } | |
| PUSCH-PowerControl ::= | SEQUENCE { |
| tpc-Accumulation | ENUMERATED { disabled } |
| msg3-Alpha | Alpha |
| p0-NominalWithoutGrant | INTEGER (−202..24) |
| p0-AlphaSets | SEQUENCE (SIZE (1.. maxNrofP0-PUSCH-AlphaSets)) OF P0-PUSCH-AlphaSet |
| pathlossReferenceRSToAddModList | SEQUENCE (SIZE (1..maxNrofPUSCH-PathlossReferenceRSs)) OF PUSCH-PathlossReferenceRS |
| pathlossReferenceRSToReleaseList | SEQUENCE (SIZE (1.. maxNrofPUSCH-PathlossReferenceRSs)) OF PUSCH-PathlossReferenceRS-Id |
| twoPUSCH-PC-AdjustmentStates | ENUMERATED {twoStates} |
| deltaMCS | ENUMERATED {enabled} |
| sri-PUSCH-MappingToAddModList | SEQUENCE (SIZE (1.. maxNrofSRI-PUSCH-Mappings)) OF SRI-PUSCH-PowerControl |
| sri-PUSCH-MappingToReleaseList | SEQUENCE (SIZE (1.. maxNrofSRI-PUSCH-Mappings)) OF SRI-PUSCH-PowerControlId |
| } | |

The UE may determine or calculate the PUSCH transmission power through the scheme and transmit the PUSCH by using the determined or calculated PUSCH transmission power.

In respect to the PUSCH transmission, there may be the following methods for uplink full power transmission.

Option 1: Refinement/adjustment of an uplink codebook may be supported

Option 1-1: The UE may support a new codebook subset for non-coherent and partial-coherent transmittable UE.

Option 1-2: Additional scaling factor for the uplink codebook

Option 2: The UE may transparently apply small cyclic or linear delay.

Option 3: Supporting a power control mechanism modified to support the uplink full power transmission without precluding the use of maximum rated PA Option 4: may depend on implementation of the UE for UE capability signaling of uplink full power transmission.

Uplink transmission of the full transmission power through multiple power amplifiers for the codebook based uplink transmission for non-coherent and partial-coherent capable UEs may be supported.

The following options may be additionally considered in relation with the uplink transmission of the full transmission power.

Option 5: In the case of a precoder in which entries are 0, a linear value $\hat{P}_{PUSCH,b,f,c}(i,j,q_d,l)$ of the PUSCH transmission power may be scaled by a ratio αRel-16. A value of αRel-16 may be selected up to a range in which the UE is implemented within a range of [αRel-16, 1]. αRel-16 represents the number of antenna ports having non-zero PUSCH transmission power and the number of antenna ports configured for a PUSCH transmission scheme defined in the NR Rel-15 specification The UE may be required to maintain a consistent αRel-16 value in different cases of PUSCH transmission by using the same precoder for the PUSCH.

The full transmission power uplink transmission having multiple power amplifiers may be at least supported for the codebook based uplink transmission for the coherent and partial/non-coherent capable UEs. Supporting such a feature may be represented by the UE as a part of UE capability signaling.

In the case of power class 3:

UE Capability 1: Full rated PA of each Tx chain may be supported with a new UE function so that the UE may support full Tx power in UL transmission.

UE Capability 2: It may be assumed that there is no transmission chain of full power with the new UE function in order for the UE to support the full transmission power in the UL transmission.

UE Capability 3: A subset of Tx chains having all class PA may be supported as a new UE function in order for the UE to support full Tx power in UL transmission.

Figure 25:
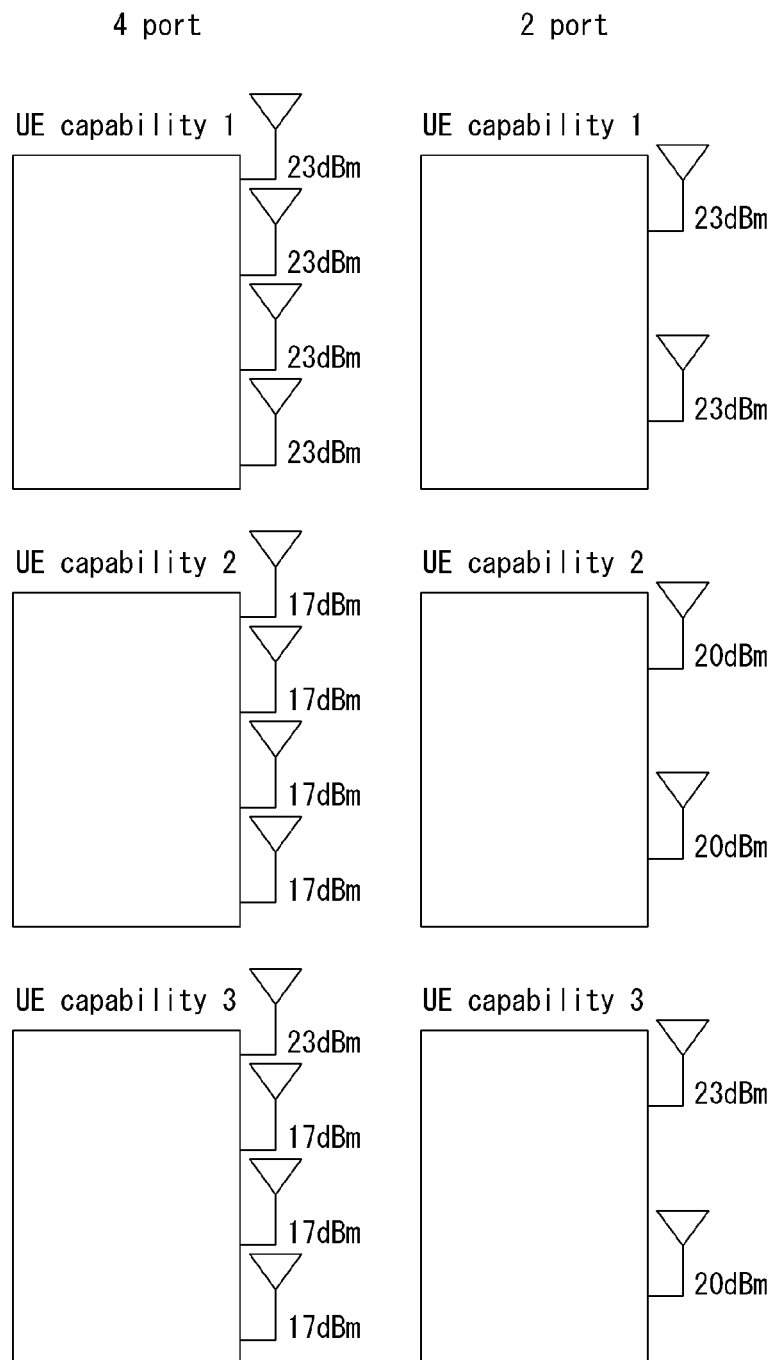
FIG. 25 is a diagram illustrating an example of a Radio Frequency (RF) chain of an antenna port to which a method proposed in the present disclosure may be applied.

FIG. 25 is a diagram illustrating an example of a Radio Frequency (RF) chain of an antenna port to which a method proposed in the present disclosure may be applied.

In the case of the codebook based uplink transmission, as shown in Table 19 below, when a specific uplink TPMI (e.g., ½*[1 0 0 0]^T which is rank1 TPMI 0 of 4 ports) is used, power which may be transmitted by the UE may be determined by a ratio of the number of ports other than 0 in the TPMI indicated by the eNB and the maximum number of SRS ports determined by the capability of the UE.

In this case, only ¼ of full power may be used, and as a result, there is a disadvantage in that coverage is reduced and the present disclosure proposes a scheme for solving the problem.

Figure 26:
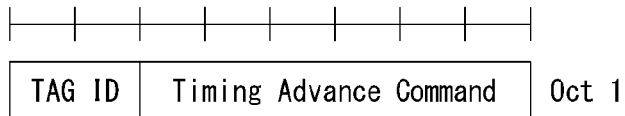
FIG. 26 is a diagram illustrating an example of timing advanced to which a method proposed in the present disclosure may be applied.

FIG. 26 is a diagram illustrating an example of timing advanced to which a method proposed in the present disclosure may be applied.

Timing advanced may be initiated by the eNB together with an MAC message that implies and adjusts the timing advanced.

The UE should adjust a timing of an uplink transmission timing of in time slot n+k for a timing advance command received in time slot n. Due to a channel assessment procedure, even when the UE may not perform configured uplink transmission, the same requirement may be applied.

The UE may compare a timing of transmission with a timing of preceding uplink transmission with relative accuracy equal to or higher than a UE timing advance adjustment accuracy requirement in Table 21 below and adjust the corresponding timing to a signaled timing advance value.

TABLE 21

| Sub Carrier Spacing, SCS kHz | 15 | 30 | 60 | 120 |
|---|---|---|---|---|
| UE Timing Advance adjustment accuracy | ±256 Tc | ±256 Tc | ±128 Tc | ±32 Tc |

Timing advance command MAC CE may be identified a lower header of MAC PDU with LCID.

The timing advance command MAC CE may have a fixed size as illustrated in FIG. 26 and may be configured as a single octet defined as follows.

TAG ID (TAG ID): This field represents TAG ID of TAG of which address is designated. TAG including SpCell has TAG Identity 0. The length of the field is 2 bits.

Timing Advance Command: This field represents index value TA (0, 1, 2 . . . 63) used for controlling a timing adjustment amount which an MAC entity should apply. The length of the field is 6 bits.

The UE may receive a value $N_{TA\_offset}$ of a timing advance offset for the serving cell by n-TimingAdvanceOffset for the serving cell. When n-TimingAdvanceOffset for the serving cell is not provided to the UE, the UE determines the default value $N_{TA\_offset}$ of the timing advance offset for the servign cell.

When the UE is constituted by two UL carriers for the serving cell, the same timing advance offset value $N_{TA\_offset}$ is applied to both carriers.

When receiving a timing advance command or a timing adjustment indication for TAG, the UE adjusts an uplink timing for PUSCH/SRS/PUCCH transmission for all serving cells of TAG based on value $N_{TA\_offset}$ which the UE expects to be the same.

When the uplink timing for PUSCH/SRS/PUCCH transmission is the same for all serving cells of TAG, the uplink timing is based on all serving cells and the received timing advance command or timing adjustment indication.

The timing adjustment indication indicates initial time alignment value $N_{TA}$ used for TAG. In the case of SCS of $2^\mu \cdot 15$ kHz, the timing advance command for TAG as a multiple of $16 \cdot 64 \cdot T_c/2^\mu$ represents a change of the uplink timing for a current uplink timing for TAG.

In the case of a random access response, the timing advance command for TAG, $T_A$ represents $N_{TA}$ by an index value of $T_A$=0, 1, 2, . . . , 3846 and here, an amount of time alignment for TAG having SCS is $2^\mu \cdot 15$ kHz and $N_{TA}=T_A \cdot 16 \cdot 64/2^\mu$. $N_{TA}$ is related to SCS of first uplink transmission from the UE after receiving the random access response.

When the UE has multiple active UL BWPs in the same TAG including UL BWP in two UL carriers of the serving cell, a timing advance command value is relative to the maximum SCS of multiple active UL BWPs. An applicable value to UL BWP having lower SCS may be rounded to match timing progress granularity for UL BWP having lower SCS while satisfying the timing progress accuracy requirement.

Adjustment of $N_{TA}$ value by a positive or negative amount indicates advancing or delaying the uplink transmission timing for TAG by each corresponding amount.

In respect to transmission except for PUSCH scheduled by a RAR UL grant and the timing advance command in slot n, corresponding adjustment of the uplink transmission timing is applied from the start of uplink slot n+k+1. Here, $k = \lceil N_{slot}^{subframe,\mu} \cdot (N_{T,1}+N_{T,2}+N_{TA,max}+0.5)/T_{sf} \rceil$ and $N_{T,1}$ represents a duration of symbol $N_1$ corresponding to a PDSCH reception time for UE processing capability 1 when additional PDSCH DM-RS is configured and $N_{T,2}$ represents a duration of symbol $N_2$ corresponding to a PUSCH preparation time for UE processing capability 1. $N_{TA,max}$ represents a maximum timing advance value which may be provided by a TA command field of 12 bits and $N_{slot}^{subframe,\mu}$ represents the number of slots per subframe, and $T_{sf}$ represents a subframe duration of 1 msec. $N_1$ and $N_2$ are determined by minimum SCS of SCS of all configured UL BWP and SCS of configured DL BWP for all uplink carriers of TAG.

Slot n and $N_{slot}^{subframe,\mu}$ are determined for the minimum SCS of SCS of all UL BWPs configured for all uplink carriers. $N_{TA,max}$ is determined for SCS of all configured UL BWPs for all uplink carriers of TAG and minimum SCS for initial active UL BWP provided by initialuplinkBWP.

When the UE changes the active UL BWP between a timing advance command receiving time and a time to which adjustment corresponding to the uplink transmission timing is applied, the UE determines the timing advance command value based on SCS of new active UL BWP. When the UE applies adjustment of the uplink transmission timing and then changes the active UL BWP, the UE assumes an absolute timing advance command value which is not changed before and after changing the active UL BWP.

When a received downlink timing is changed and compensated only partially by uplink timing adjustment without the timing advance command, the UE is accordingly changed.

When two adjacent slots overlap with each other due to the TA command, the duration of the latter slot may be reduced compared with the duration of the former slot.

Hereinafter, a method for transmitting the uplink data by using the full power transmission power proposed in the present disclosure will be described.

<Proposal 1: When the UE Reports UE Capability 1, a Power Scaling Value is Calculated as 1 at the Time of Transmitting the PUSCH for Active BWP and Antenna Ports of Performing Non-Zero Power PUSCH Transmission of the UE Evenly Divide and Transmit Power.>

In the case of the codebook based uplink transmission, when PUSCH power control described above is performed, a ratio of available full power is shown in Tables 20 and 21 below.

Further, in Tables 22 and 23, ρ represents the number of configured SRS ports (# of configured SRS ports) or SRS ports which are fully supported depending on a UE capability and $\rho_0$ represents the number of non-zero elements in the TPMI indicated by the eNB or the number of non-zero power PUSCH transmission ports. Further, coherent transmission is defined as follows.

Full coherence: All ports may be coherently transmitted.

Partial coherence: Port pairs may be coherently transmitted.

Non-coherence: Port pairs may not be coherently transmitted.

TABLE 22

|  |  | Non coherent UE | Full coherent UE | |
|---|---|---|---|---|
|  |  | Non coherent TPMI | Non coherent TPMI | Fully coherent TPMI |
| Rank 1 | TPMI index | 0.1 | 0.1 | 2~5 |
|  | Ratio $\left(\frac{\rho_0}{\rho}\right)$ | 1/2 | 1/2 | 1 |
| Rank 2 | TPMI index | 0 | 0 | 1.2 |
|  | Ratio $\left(\frac{\rho_0}{\rho}\right)$ | 1 | 1 | 1 |

TABLE 23

|  |  | Non coherent UE | Partial coherent UE | | Full coherent UE | | |
|---|---|---|---|---|---|---|---|
|  |  | Non coherent TPMI | Non coherent TPMI | Partial coherent TPMI | Non coherent TPMI | Partial coherent TPMI | Fully coherent TPMI |
| Rank 1 | TPMI index | 0~3 | 0~3 | 4~11 | 0~3 | 4~11 | 12-27 |
|  | Ratio $\left(\frac{\rho_0}{\rho}\right)$ | 1/4 | 1/4 | 1/2 | 1/4 | 1/2 | 1 |
| Rank 2 | TPMI index | 0~5 | 0~5 | 6~13 | 0~5 | 6~13 | 14~21 |
|  | Ratio $\left(\frac{\rho_0}{\rho}\right)$ | 1/2 | 1/2 | 1 | 1/2 | 1 | 1 |
| Rank 3 | TPMI index | 0 | 0 | 1.2 | 0 | 1.2 | 3~6 |
|  | Ratio $\left(\frac{\rho_0}{\rho}\right)$ | 3/4 | 3/4 | 1 | 3/4 | 1 | 1 |
| Rank 4 | TPMI index | 0 | 0 | 1.2 | 0 | 1.2 | 3.4 |
|  | Ratio $\left(\frac{\rho_0}{\rho}\right)$ | 1 | 1 | 1 | 1 | 1 | 1 |

In Proposal 1, when the UE supports UE capability 1, since full power transmission is available for each of all ports, it is preferable to permit the full power transmission for each port, in order to improve uplink coverage of the UE. To this end, in Proposal 1, when the UE reports UE capability 1 to the eNB, the power scaling factor (value) may be calculated as 1 regardless of the TPMI indicated by Downlink Control Information (DCI) of the eNB at the time of transmitting the PUSCH for active BWP.

In this case, the UE may evenly distribute the transmission power among the antenna ports of performing non-zero power PUSCH transmission and transmit the PUSCH which is the uplink data. The power control may be limited to specific rank (e.g., when rank is 1) transmission.

In other words, when the value of TRI is 1 in Proposal 1, 1 is used as the scaling value for determining the transmission power and when the TRI is indicated as another value, the power control method described above may be used.

In this case, the UE may directly report the capability of the UE to the eNB or report information (e.g., the maximum port number, a subset of supportable TPMI, etc.) associated with the capability.

For example, the UE may directly report to the eNB whether the capability of the UE is Capability 1, 2, or 3 or transmit to the eNB the information related to the capability. In this case, the information related to the capability may include the maximum number of ports which the UE supports for PUSCH transmission and/or the subset of the TPMI and the subset of the TPMI may include at least one TPMI supported by the UE.

In the case of uplink full power transmission for capabilities 2 and 3 of the UE, the following may be supported.

In order to support capabilities 2 and 3 according to the capability of the UE, the UE may be configured as one of two full power operation modes.

The UE may be configured in the network in order to support full power transmission.

mode 1: The UE may be configured by one or more SRS resources having the same number of SRS ports in an SRS resource set in which a configuration for the use of a resource is configured to codebook.

The eNB may configure the UE to so as to use a lower set of TPMI of generating the full power transmission by combining the ports in the layer.

A new codebook subset may be applied only to a rank value in which the full power transmission is unavaialable in the uplink.

mode 2: The UE may be configured by several SRS resources having one SRS resource or a plurality of SRS resources in the SRS resource set in which the configuration for the use of the resource is configured to the codebook.

The UE may transmit the SRS and the PUSCH by the same scheme regardless of the use of antenna virtualization.

Rel-15 codebook and a codebook subset may be used.

The uplink full power transmission may be performed for the PUSCH transmission according to the indicated SRI and/or TPMI.

In this regard, for an SRS resource having one or more ports, in order to at least support UE capability 3, the UE may signal to the eNB a TPMI set of transferring the full power.

<Proposal 2: When the UE Reports UE Capability 1, the Power Scaling Value is Calculated as a at the Time of Transmitting the PUSCH for Active BWP and Antenna Ports of Performing Non-Zero Power PUSCH Transmission of the UE Evenly Divide and Transmit Power. Here, the Value of a May be Determined by Higher Layer Signaling (e.g., RRC or MAC CE) or Dynamic Signaling (e.g., DCI).>

In the case of Proposal 2, even though the UE reports UE capability 1, what power scaling the UE is to perform may be determined by using the higher layer signaling or dynamic signaling.

As below, as an example for the alpha value according to 1-bit signaling, when the eNB indicates a state of "0" to the UE, the UE operates in the existing Rel-15 power control mode to save a battery of the UE by performing antenna turn-off in specific port selection or port group selection TPMI.

Further, when the eNB indicates a state of "1" to the UE, the UE may increase the coverage of the UE by performing full power transmission (e.g., max 23 dBm transmission) regardless of the TPMI indicated by the eNB.

The power control may be limited to be applied only to the case of the specific rank (e.g., when rank is 1) transmission. In other words, in the example, in the case of TRI=1, 1 may be used as the scaling value and when another TRI is indicated, Rel-15 power control may be applied.

TABLE 24

| Parameter state | α |
|---|---|
| 0 | the ratio of the number of antenna ports with a non-zero PUSCH transmission power to the maximum number of SRS ports supported by the UE in one SRS resource |
| 1 | 1 |

In other words, in Proposal 2, even when the UE directly or indirectly reports the capability thereof as a capability to enable the full power transmission, the transmission power may be limited by the alpha value transmitted by the eNB.

<Proposal 3: The TPMI by the New Codebook Subset May be Indicated Regardless of Reporting of the Capability of the UE as the Non-Coherent or Non-and-Partial Coherent Capability. For Example, the Codebook Subset May be Indicated to the UE by the eNB so that a Non-Coherent UE Also Use Fully Coherent TPMI.>

In other words, even when it is reported to the eNB that the capability of the UE is non-coherence or non-and-partial coherence, the eNB may indicate to the UE the TPMI for PUSCH transmission using the full power transmission regardless of the capability reported by the UE.

In this case, Proposal 3 may be performed only in the following limited situations.

Fully coherence TPMIs may be used only in the case of rank 1 for 2 ports or the fully coherence TPMIs may be used only in the case of rank 1 for 4 ports.

Partial coherence TPMIs may be permitted for the non-coherence UE in the case of ranks 1, 2, and 3 for 4 ports. As the TPMI to which the codebook subset is applied is distinguished in Tables 20 and 21, the codebook subset may be applied at TPMI group levels including Non coherent TPMI, Partial coherent TPMI, Fully coherent TPMI, and the like and this may be applied only to a designated specific rank as described above.

Alternatively, for flexibility, the eNB may indicate to the UE limitation of the codebook subset of all TPMIs with a 9-bit bitmap (6+3) in the case of 2 ports and indicate to the UE the limitation of the codebook subset of the TPMI with a 62-bit bitmap (28+22+7+5) in the case of 4 ports.

Alternatively, in order to reduce signaling overhead, the eNB may indicate to the UE only a codebook subset for a specific rank (e.g., when a rank value is 1, etc.) as the bitmap. Proposals 3 and 3-1 may be applied to the case where the UE reports UE capability 2 and/or 3.

If the codebook subset determined by the capability for the full power transmission is different from the codebook subset related to the coherent transmission, when both codebook subsets conflict with each other, for example, when codebook subsets indicated by a full power capability and a non-coherent capability conflict with each other, the codebook subset by the full power capability may be further prioritized or a union of two subsets may become a final codebook subset. The UE may not expect to receive an indication of TPMI other than the TPMIs included in the codebook subset. In other words, when the TPMI value other than the TPMIs included in the codebook subset is indicated by the eNB, the UE may determine the corresponding indication as a wrong indication.

<Proposal 4: The UE May Report to the eNB a Subset of TPMI which the UE May Use and Apply/Transmit Through Capability Signaling for the UE for Uplink Transmission Using Full Power.>

Proposal 4 is a scheme for covering various RF architectures depending on UE implementation like UE capability 3. In other words, the eNB may obtain some information regarding what RF architecture the UE by Proposal 3. Accordingly, the proposal may operate in link with Proposal 1 or 1-1 based on information which the UE reports as the capability thereof.

In other words, when the UE reports to the eNB the codebook subset as the capability of the UE, the eNB may determine that the uplink transmission of the corresponding TPMIs is available with the full power and use 1 as the power scaling value at the time of transmitting the PUSCH using the corresponding TPMI.

Table 25 below shows an example of signaling for reporting the capability of the UE using a 3-bit bitmap.

TABLE 25

| State | TPMI subset |
|---|---|
| 0 | Non-coherent TPMI |
| 1 | Partial-coherent TPMI |
| 2 | Full-coherent TPMI |

Alternatively, the UE may report to the eNB available TPMI among all available TPMIs with the 9-bit bitmap (6+3) in the case of 2 ports and report to the eNB whether to use full TPMI using the 62-bit bitmap (28+22+7+5) in the case of 4 ports.

Such a method may be limited to a specific rank and/or specific TPMI group in order to reduce overhead of signaling for the capability of the UE.

For example, when the UE reports the capability to the eNB only with rank 1 and the non-coherent codebook, the UE may report to the eNB an available part with a 2-bit bitmap (TPMIs 0 and 1) for 2 ports and a 4-bit bitmap (TPMIs 0 to 3) for 4 ports.

As another example, when the UE reports the capability to the eNB only with rank 1 and the non-partial coherent codebook, the UE may report to the eNB information on available TPMI with the 2-bit bitmap for 2 ports as it is and a 12-bit bitmap (TPMIs 0 to 11) for 4 ports.

In the bitmap, "0" indicates not available and "1" indicates available (or vice versa). Alternatively, when only rank 1 is used, 6 bits may be used for 2 ports and 28 bits may be used for 4 ports. In the case of the full power transmittable rank limitation, the UE may configure the information as a separate field (2-port 2 bit and 4-port 4 bit) and report the information to the eNB.

In other words, in Proposal 4, the UE may transmit the information associated with the capability, which includes a subset of TPMI including at least one TPMI capable of performing the uplink transmission with the full transmission power by the UE while transmitting the information associated with the capability of the UE to the eNB.

In this case, when a control message (e.g., DCI) transmitted from the eNB, which includes at least one TPMI transmitted by the UE is indicated, the UE may transmit the uplink data using the full transmission power. In other words, in this case, the uplink data may be transmitted through the transmission power by configuring the scaling value to '1'.

However, when the TPMI indicated by the eNB is not included in at least one subset, the UE may transmit the uplink data with a value smaller than the full transmission power. In other words, in this case, the uplink data may be transmitted through the transmission power by configuring the scaling value to a value smaller than '1'.

<Proposal 4-1: Based on the Codebook Subset (Via UE Capability Signaling) Reported by Proposal 4, a Size of a TRI+TPMI Field in the DCI Indicated by the eNB is Reduced to Reduce a DCI Payload.>

In the case of Proposal 4-1, for example, when the UE reports to the eNB the information associated with the capability thereof with a bitmap of [1 0 1 1 1 1 1 1 1] among 2-port 9-bit bitmaps, the size of the TRI+TPMI field in the DCI may indicate the TPMI which the UE uses for the PUSCH transmission with a bitwidth which is reduced from existing 4 bits to 3 bits.

<Proposal 4-2: By UE Capability 1, 2, 3, and/or Coherency Capability (Non, Partial, Full Coherence) Reported by the UE, the eNB Indicates to the UE the Codebook Subset to be Used by the UE Through a Higher Layer (e.g., MAC CE or DCI).>

For example, when the UE reports to the eNB UE capability 2 and non-coherent capability, the eNB may not indicate a subset of non-coherent TPMI (e.g., 2-port TPMI index 0 to 1 for rank 1) only for coherency transmission like Rel-15, but use non-and-fully coherent TPMI, i.e., (e.g., 2-port TPMI index 0 to 5 for rank 1) and the limitation may be configured only for a specific rank. When the codebook subsets indicated by the full power capability and the non-coherent capability conflict with each other, the codebook subset by the full power capability may be further prioritized or the union of two subsets may be the final codebook subset.

<Proposal 5: For Coherence Uplink Transmission of the UE, the eNB May Indicate to the UE Per Port (or Per Beam or Per Antenna or Panel) Timing Advance.>

It is proposed that in the case of UE capabilities 2 and 3, for full power uplink transmission, a higher TPMI subset higher than the coherent transmission capability thereof is used. In such a case, according to a channel experienced by the UE, in any case, when an uplink signal transmitted in each port a good capability is received by the eNB, a phase is well-matched in a most uplink scheduling band, and as a result, the UE shows a good capability, while in any case, the phase is not well-matched in the uplink scheduling band, and as a result, the capability may be degraded.

Accordingly, the eNB may calculate optimum timing advance (TA) per port based on, for example, information measured from SRS or the channel reciprocity and indicate the optimum TA to the UE and the UE may use the optimum TA for uplink full power transmission using the information. In the case of the proposal, the codebook based uplink transmission is described as an example, but the proposal may be applied even to the non-codebook based UL. The scheme of independently configuring the TA per antenna may be used for compensating capability degradation by acquiring an effect of small-delay cyclic-delay-diversity (CDD) according to an indicated resolution of the TA. Accordingly, the resolution of the TA may have a time resolution (e.g., OFDM symbol level or less) different from a TA offset value configured by MAC-CE.

<Proposal 5-1: In the Case of Proposal 5, Since it May be Inefficient to Allocate Independent TA for Each Port, the Signaling Overhead May be Effectively Reduced in the Form of Common TA+Differential TA.>

Basically, the TA is indicated to the UE through MAC CE (e.g., 12 bits). Accordingly, both Common TA and differential TA proposed above may be indicated through the MAC CE and differential bit may be used for fine-tuning with bit-width smaller than bit-width of a common value. Alternatively, it may be considered that in order to more efficiently use Proposal 5 or 5-1, common TA is indicated through MAC CE (e.g., 12 bits) and differential TA is signaled to the UE through DCI (e.g., 2 bits).

Table 26 below shows an example in which differential TA is indicated through 2-bit signaling. In the proposal, common TA may be a value allocated to the UE and there may be a scheme in which differential TA is independently applied to all ports which the UE uses for the uplink transmission. Alternatively, common TA may use a specific reference port (e.g., port 0) and the remaining port (or beam or antenna or panel) is indicated by differential TA to further reduce the payload (e.g., DCI).

TABLE 26

| State | Differential TA value |
|---|---|
| 00 | 0 |
| 01 | +1 |
| 10 | +2 |
| 11 | −1 |

Proposals 1 to 5-1 described above may be used singly or as a combination of the proposals.

Figure 27:
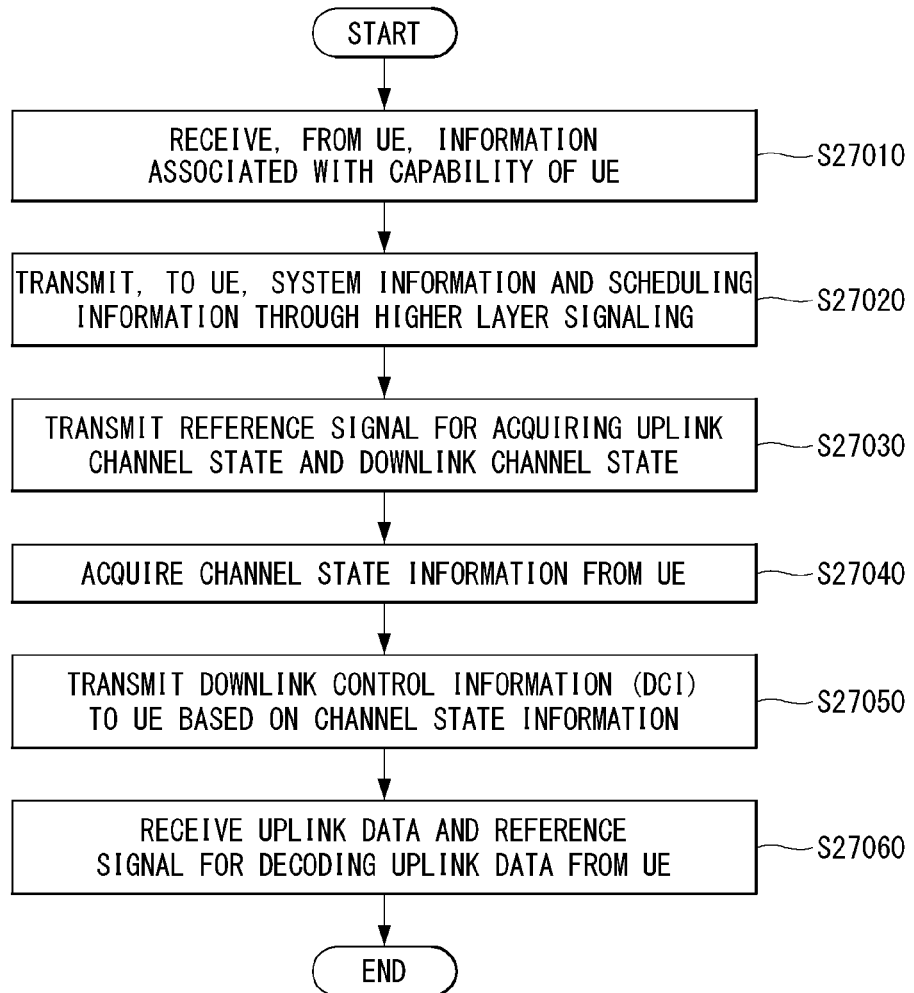
FIG. 27 illustrates an example of an operation flowchart of an eNB receiving uplink data to which a method proposed in the present disclosure may be applied.

FIG. 27 illustrates an example of an operation flowchart of an eNB receiving uplink data to which a method proposed in the present disclosure may be applied.

Referring to FIG. 27, the eNB may receive from the UE information associated with a capability of the UE (S27010). For example, the eNB may receive from the UE information including information (e.g., capability 1, 2 or 3) directly indicating the capability of the UE or receive from the UE information including information (e.g., # of supported ports, coherency capability, and full power transmission capability) indirectly indicating the capability of the UE.

For example, the eNB may receive from the UE information including a TPMI subset including at least one TPMI capable of transmitting the uplink data with the maximum number of ports and/or the full transmission power supported by the UE.

Thereafter, the eNB may transmit system information and scheduling information to the UE through the higher layer signaling (S27020). In this case, the system information and scheduling information may be transmitted through a higher layer (e.g., RRC or MAC CE).

Thereafter, the eNB may transmit a reference signal (e.g., SRSSB, CSI-RS, TRS, or PT-RS) for acquiring an uplink channel state and a downlink channel state (S27030), and the UE may transmit to the eNB an RS (e.g., SRS) in order to acquire uplink link channel state information of the UE.

Thereafter, the eNB may acquire channel state information from the UE (S27040), and the eNB may indicate to the UE uplink scheduling information and SRI/TPMI/TRI/MCS information by using the acquired channel information of the UE (S27050). In this case, the uplink scheduling information and the SRI/TPMI/TRI/MCS information may be included in the DCI and transmitted.

Thereafter, the eNB may receive from the UE uplink data and a reference signal for decoding the uplink data (S27060). In other words, the eNB may receive from the UE data to which precoding is applied and an RS (e.g., DMRS) (scheduled) for data decoding.

Figure 28:
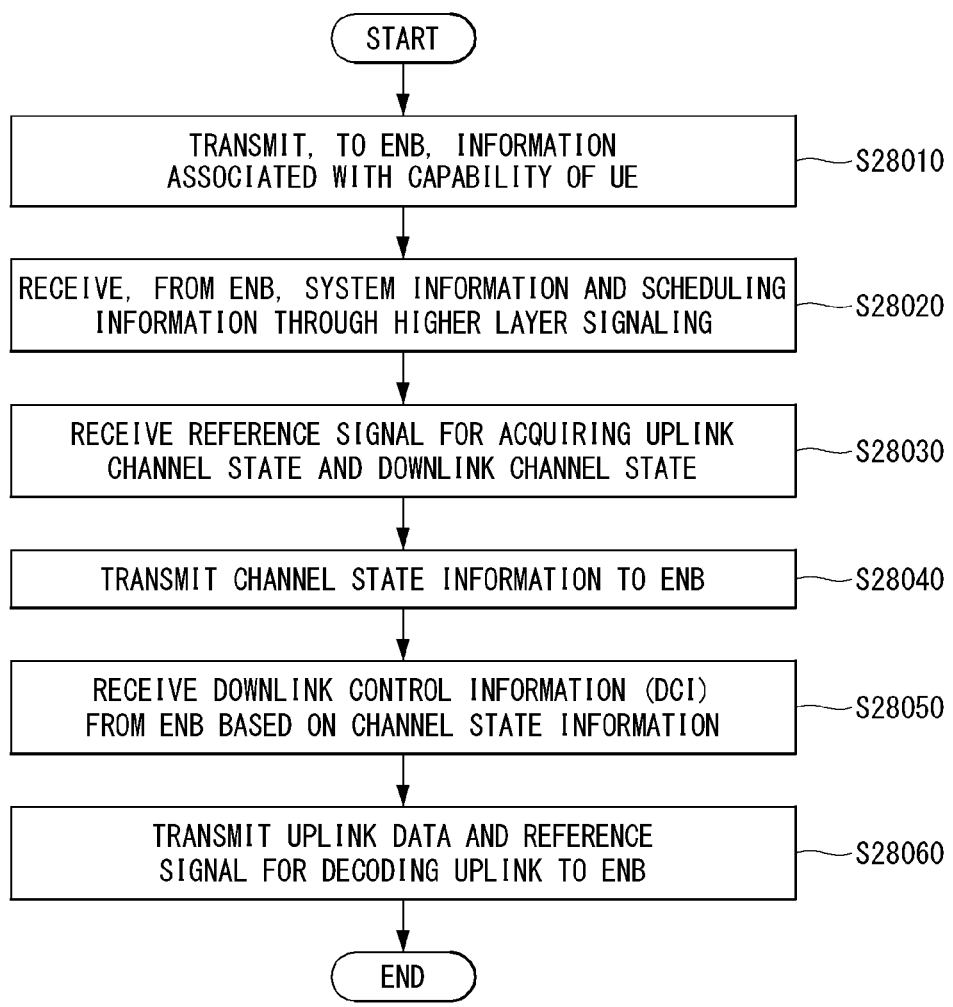
FIG. 28 illustrates an example of an operation flowchart of an eNB receiving uplink data to which a method proposed in the present disclosure may be applied.

FIG. 28 illustrates an example of an operation flowchart of an eNB receiving uplink data to which a method proposed in the present disclosure may be applied.

The UE may transmit to the eNB information related to a capability of the UE (S28010). For example, the UE may transmit to the eNB information including information (e.g., capability 1, 2, or 3) directly indicating the capability of the UE or transmit to the eNB information including information (e.g., # of supported ports, coherency capability, and full power transmission capability) indirectly indicating the capability of the UE (S28010).

For example, the UE may transmit to the eNB information including a TPMI subset including at least one TPMI capable of transmitting the uplink data with the maximum number of ports and/or the full transmission power supported by the UE.

Thereafter, the UE may receive from the eNB system information and scheduling information through the higher layer signaling (S28020). In this case, the system information and the scheduling information may be received through a higher layer (e.g., RRC or MAC CE).

Thereafter, the UE may receive a reference signal (e.g., SRSSB, CSI-RS, TRS, or PT-RS) for acquiring an uplink channel state and a downlink channel state (S28030), and the UE may transmit to the eNB an RS (e.g., SRS) in order to acquire uplink link channel state information of the UE.

Thereafter, the UE may transmit channel state information to the eNB (S28040), and receive from the eNB an indication of uplink scheduling information and SRI/TPMI/TRI/MCS information based on channel information (S28050). In this case, the uplink scheduling information and the SRI/TPMI/TRI/MCS information may be included in the DCI and received.

Thereafter, the UE transmit to the eNB uplink data and a reference signal for decoding the uplink data (S28060). In other words, the UE may transmit from the eNB data to which precoding is applied and an RS (e.g., DMRS) (scheduled) for data decoding.

Figure 29:
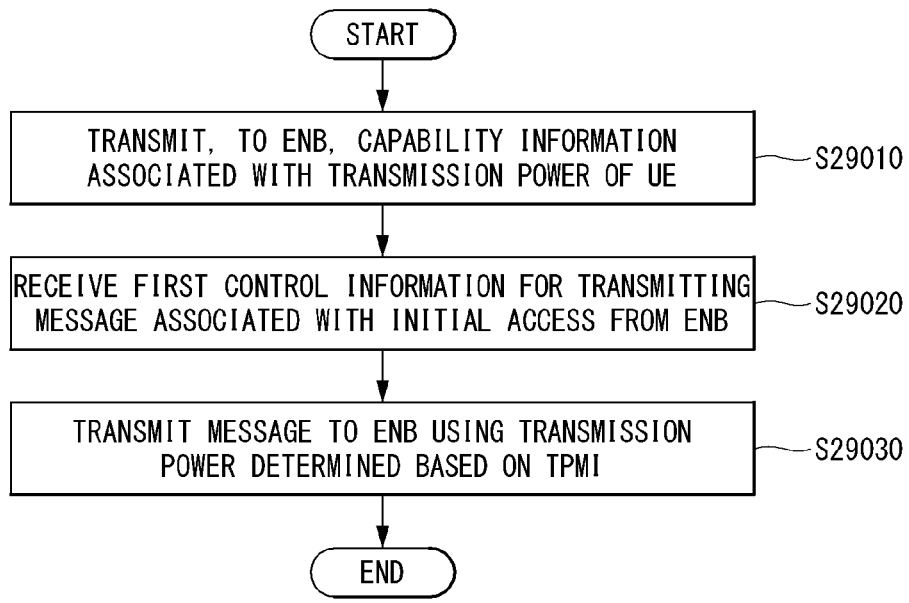
FIG. 29 illustrates an example of an operation flowchart of a UE for determining transmission power for transmitting uplink data to which a method proposed in the present disclosure may be applied.

FIG. 29 illustrates an example of an operation flowchart of a UE for determining transmission power for transmitting uplink data to which a method proposed in the present disclosure may be applied. For example, the uplink data of FIG. 29 may be a message which the UE transmits to the eNB in the initial access procedure, The UE may transmit to the eNB information associated with a capability of the UE (S29010). For example, as described in Proposals 1 to 5-1 and FIG. 28, the UE may transmit to the eNB information including information (e.g., capability 1, 2, or 3) directly indicating the capability of the UE or transmit to the eNB information including information (e.g., # of supported ports, coherency capability, and full power transmission capability) indirectly indicating the capability of the UE.

For example, the UE may transmit to the eNB information including a TPMI subset including at least one TPMI capable of transmitting the uplink data with the maximum number of ports and/or the full transmission power supported by the UE.

For example, an operation of the UE (e.g., reference numeral 3110 and/or 3120 of FIGS. 31 to 34) which transmits the information in step S29010 described above may be implemented by devices of FIGS. 31 to 34 to be described below. For example, referring to FIG. 31, one or more processors 102 may control one or more transceivers 106 and/or one or more memories 104 so as to transmit the configuration information and one or more transceivers 106 may transmit the information.

Thereafter, the UE may receive from the eNB first control information for transmission of a message associated with initial access (S29020).

In this case, the first control information may include a TPMI used for the UE to transmit the uplink data. In other words, the DCI may include a TPMI to be used which the UE configured by the eNB is to use for transmitting the uplink data.

For example, an operation of the UE (e.g., reference numeral 3110 and/or 3120 of FIGS. 31 to 34) which receives the first control information in step S29020 described above may be implemented by devices of FIGS. 31 to 34 to be described below. For example, referring to FIG. 31, one or more processors 102 may control one or more transceivers 106 and/or one or more memories 104 so as to receive the first control information and one or more transceivers 106 may receive the DCI.

Thereafter, the UE may transmit the message to the eNB by using transmission power determined based on the TPMI (S29030). For example, when the TPMI indicated by the eNB through the first control information is included in the at least one TPMI included in information which the UE reports to the eNB, the UE may transmit the uplink data to the eNB through full transmission power.

An operation of the UE (e.g., reference numeral 3110 and/or 3120 of FIGS. 31 to 34) which transmits the message in step S29030 described above may be implemented by devices of FIGS. 31 to 34 to be described below. For example, referring to FIG. 31, one or more processors 102 may control one or more transceivers 106 and/or one or more memories 104 so as to transmit the message and one or more transceivers 106 may transmit the message.

In this case, the scaling factor for determining the transmission power may be configured to '1'.

However, when the TPMI indicated by the eNB through the first control information is not included in the at least one TPMI included in information which the UE reports to the eNB, the UE may transmit the uplink data to the eNB through transmission power smaller than the full transmission power.

In this case, the scaling factor for determining the transmission power may be configured to a value smaller than '1'.

In the embodiment, the UE may receive from the eNB a second control information including the full transmission power usable by the UE and the second control information may further include mode information related to at least one transmission mode which may be applied to the UE. Further, when information reported to the eNB by the UE is information related to a specific capability of the UE, the transmission power for transmitting the uplink data may be configured as the full transmission power. Alternatively, when the information reported to the eNB by the UE is the information associated with the specific capability of the UE, a scaling value for determining the transmission power may be received from the eNB. Further, the transmission power determined based on the scaling value may be evenly distributed among a single or a plurality of antenna ports using non-zero power for transmitting an uplink channel.

Figure 30:
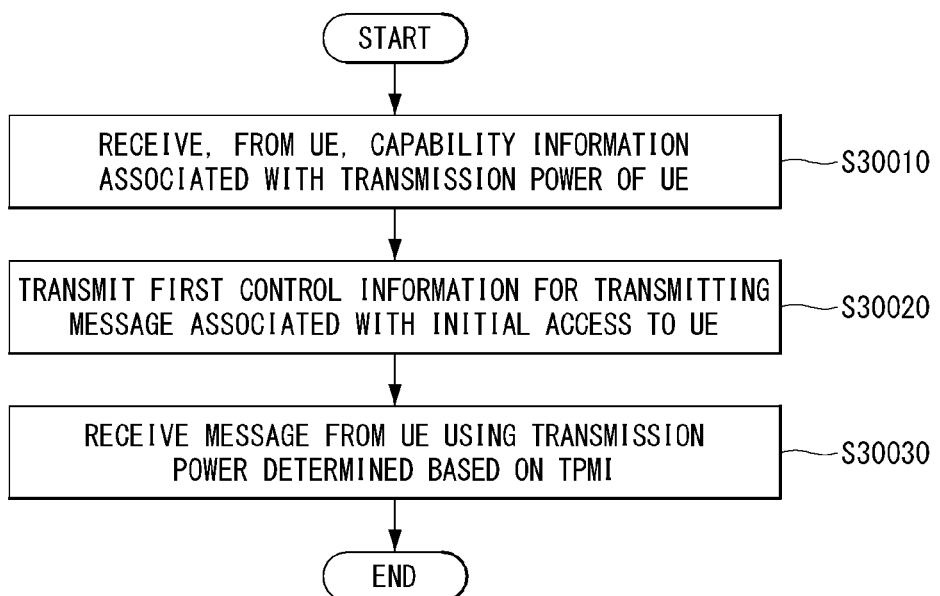
FIG. 30 illustrates an example of an operation flowchart of an eNB for determining transmission power for transmitting uplink data to which a method proposed in the present disclosure may be applied.

FIG. 30 illustrates an example of an operation flowchart of an eNB for determining transmission power for transmitting uplink data to which a method proposed in the present disclosure may be applied.

Referring to FIG. 30, the eNB may receive capability information associated with transmission power of the UE from the UE (S30010). For example, as described in Proposals 1 to 5-1 and FIG. 27, the UE may transmit to the eNB information including information (e.g., capability 1, 2, or 3) directly indicating the capability of the UE or transmit to the eNB information including information (e.g., # of supported ports, coherency capability, and full power transmission capability) indirectly indicating the capability of the UE.

For example, the UE may transmit to the eNB information including a TPMI subset including at least one TPMI capable of transmitting the uplink data with the maximum number of ports and/or the full transmission power supported by the UE.

For example, an operation of the eNB (e.g., reference numeral 3110 and/or 3120 of FIGS. 31 to 35) which receives the information in step S30010 described above may be implemented by devices of FIGS. 31 to 35 to be described below. For example, referring to FIG. 31, one or more processors 102 may control one or more transceivers 106 and/or one or more memories 104 so as to transmit the information and one or more transceivers 106 may receive the information.

Thereafter, the eNB may transmit to the UE first control information for transmission of uplink data (S30020).

In this case, the first control information may include a TPMI used for the UE to transmit the uplink data. In other words, the first control information may include a TPMI to be used which the UE configured by the eNB is to use for transmitting the uplink data.

For example, an operation of the eNB (e.g., reference numeral 3110 and/or 3120 of FIGS. 31 to 35) which transmits the first control information in step S30020 described above may be implemented by devices of FIGS. 31 to 35 to be described below. For example, referring to FIG. 31, one or more processors 102 may control one or more transceivers 106 and/or one or more memories 104 so as to transmit the first control information and one or more transceivers 106 may transmit the first control information.

Thereafter, the eNB may receive the message from the UE using the transmission power determined based on the TPMI (S30030). For example, when the TPMI indicated by the eNB through the first control information is included in the at least one TPMI included in information which the UE reports to the eNB, the eNB may receive the uplink data from the UE through full transmission power.

For example, an operation of the eNB (e.g., reference numeral 3110 and/or 3120 of FIGS. 31 to 35) which receives the message in step S30020 described above may be implemented by devices of FIGS. 31 to 35 to be described below. For example, referring to FIG. 31, one or more processors 102 may control one or more transceivers 106 and/or one or more memories 104 so as to transmit the message and one or more transceivers 106 may transmit the message.

In this case, the scaling factor for determining the transmission power may be configured to '1'.

However, when the TPMI indicated by the eNB through the first control information is not included in the at least one TPMI included in information which the UE reports to the eNB, the eNB may receive the uplink data from the UE through transmission power smaller than the full transmission power.

In this case, the scaling factor for determining the transmission power may be configured to a value smaller than '1'.

In the embodiment, the eNB may transmit to the UE second control information including the full transmission power available by the UE and the second control information may further include mode information related to at least one transmission mode which may be applied to the UE. Further, when information reported to the eNB by the UE is information related to a specific capability of the UE, the transmission power for transmitting the uplink data may be configured as the full transmission power.

Further, in the methods and embodiments, the UE and/or the eNB which operate according to each of the steps of FIGS. 27 to 30 may be specifically implemented by devices of FIGS. 31 to 35 to be described below. For example, the eNB may correspond to a first wireless device and the UE may correspond to a second wireless device and in some cases, an opposite thereto may also be considered.

For example, the eNB/UE signaling and operation (e.g., FIGS. 27 to 30) may be processed by one or more processors (e.g., 102 and 202) of FIGS. 31 to 35 and the eNB/UE signaling and operation (e.g., FIGS. 27 to 30) may be stored in a memory (e.g., one or more memories (e.g., 104 and 204) of FIGS. 28 to 32) in the form of a command/program (e.g., instruction and executable code) for driving at least one processor (e.g., 102 and 202) of FIGS. 31 to 35.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 31:
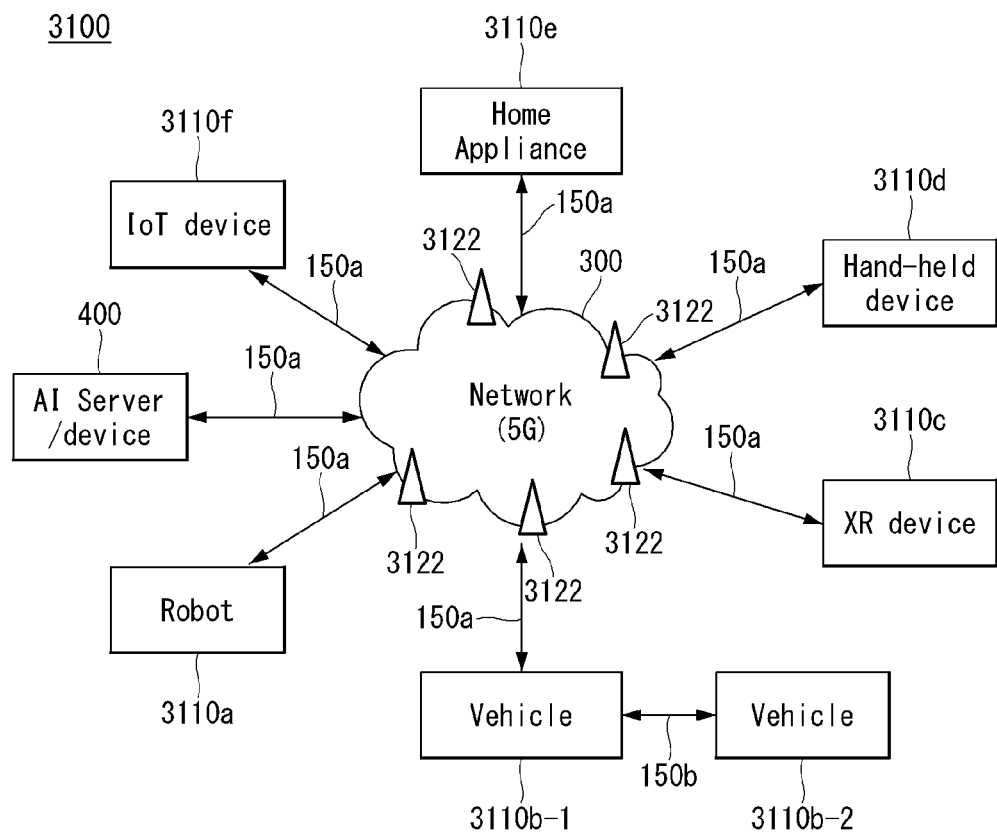
FIG. 31 illustrates a communication system applied to the present disclosure.

FIG. 31 illustrates a communication system applied to the present disclosure.

Referring to FIG. 31, a communication system 3100 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 3110a, vehicles 3110b-1 and 3110b-2, an eXtended Reality (XR) device 3110c, a hand-held device 3110d, a home appliance 3110e, an Internet of Things (IoT) device 3110f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 3120a may operate as a BS/network node with respect to other wireless devices.

The wireless devices 3110a to 3110f may be connected to the network 300 via the BSs 3120. An AI technology may be applied to the wireless devices 3110a to 3110f and the wireless devices 3110a to 3110f may be connected to the AI server 400 via the network 300. The network 300 may be configured using a 3G network, a 4G (e.g., LTE) network, or a 5G (e.g., NR) network. Although the wireless devices 3110a to 3110f may communicate with each other through the BSs 3120/network 300, the wireless devices 3110a to 3110f may perform direct communication (e.g., sidelink communication) with each other without passing through the BSs/network. For example, the vehicles 3110b-1 and 3110b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 3110a to 3110f.

Wireless communication/connections 150a, 150b, or 150c may be established between the wireless devices 3110a to 3110f/BS 3120, or BS 3120/BS 3120. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Wireless Devices Applicable to the Present Disclosure

Figure 32:
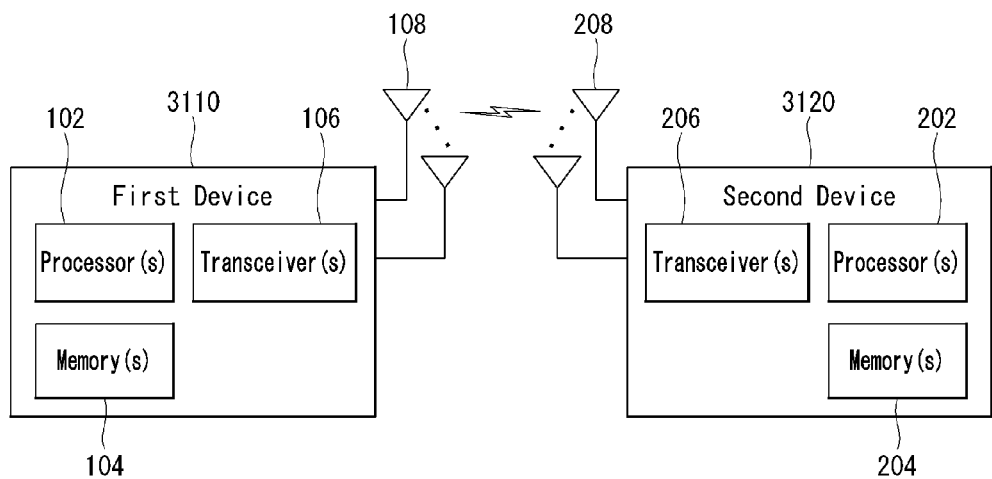
FIG. 32 illustrates a wireless device which may be applied to the present disclosure.

FIG. 32 illustrates wireless devices applicable to the present disclosure.

Referring to FIG. 32, a first wireless device 3110 and a second wireless device 3120 may transmit radio signals through a variety of RATs (e.g., LTE and NR). Herein, {the first wireless device 3110 and the second wireless device 3120} may correspond to {the wireless device 3110x and the BS 3120} and/or {the wireless device 3110x and the wireless device 3110x} of FIG. 31.

The first wireless device 3110 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 3120 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 3110 and 3120 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Signal Processing Circuit Example to which Present Disclosure is Applied

Figure 33:
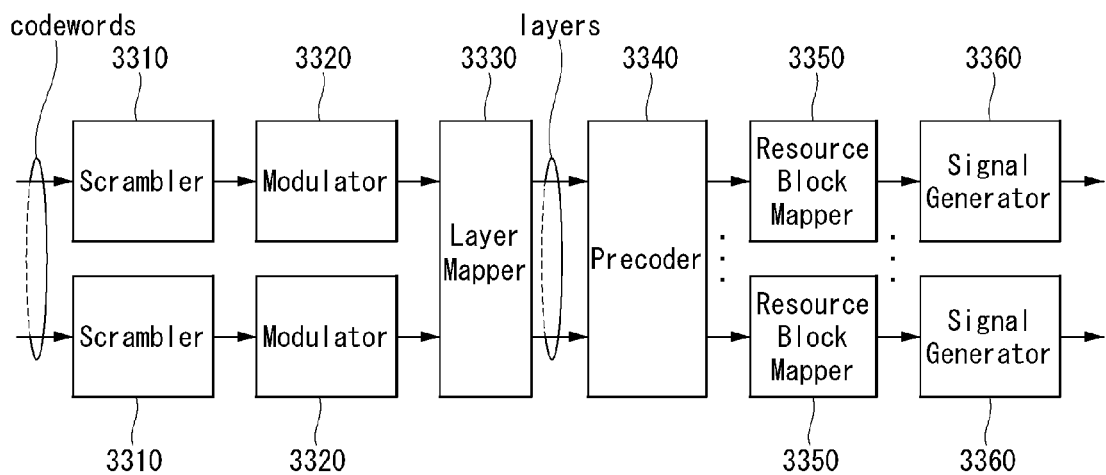
FIG. 33 illustrates a signal processing circuit for a transmit signal.

FIG. 33 illustrates a signal processing circuit for a transmit signal.

Referring to FIG. 33, a signal processing circuit 3300 may include a scrambler 3310, a modulator 3320, a layer mapper 3330, a precoder 3340, a resource mapper 3350, and a signal generator 3360. Although not limited thereto, an operation/function of FIG. 33 may be performed by the processors 102 and 202 and/or the transceivers 106 and 206 of FIG. 32. Hardware elements of FIG. 33 may be implemented in the processors 102 and 202 and/or the transceivers 106 and 206 of FIG. 32. For example, blocks 3310 to 3360 may be implemented in the processors 102 and 202 of FIG. 32. Further, blocks 3310 to 3350 may be implemented in the processors 102 and 202 of FIG. 32 and the block 3360 of FIG. 32 and the block 2760 may be implemented in the transceivers 106 and 206 of FIG. 32.

A codeword may be transformed into a radio signal via the signal processing circuit 3300 of FIG. 33. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 3310. A scramble sequence used for scrambling may be generated based on an initialization value and the initialization value may include ID information of a wireless device. The scrambled bit sequence may be modulated into a modulated symbol sequence by the modulator 3320. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 3330. Modulated symbols of each transport layer may be mapped to a corresponding antenna port(s) by the precoder 3340 (precoding). Output z of the precoder 3340 may be obtained by multiplying output y of the layer mapper 3330 by precoding matrix W of N*M. Here, N represents the number of antenna ports and M represents the number of transport layers. Here, the precoder 3340 may perform precoding after performing transform precoding (e.g., DFT transform) for complex modulated symbols. Further, the precoder 3340 may perform the precoding without performing the transform precoding.

Figure 34:
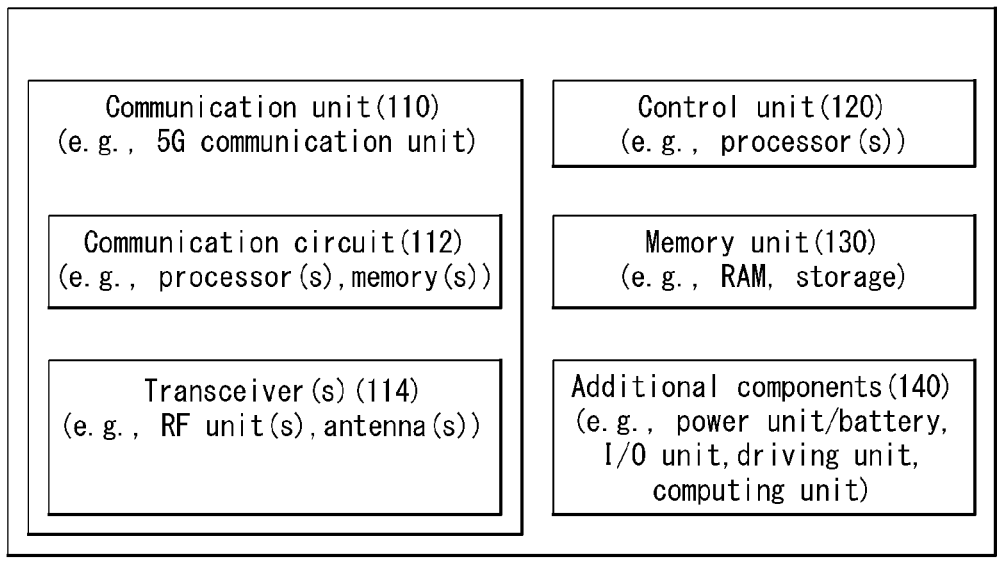
FIG. 34 illustrates another example of a wireless device applied to the present disclosure.

The resource mapper 3350 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 3360 may generate the radio signal from the mapped modulated symbols and the generated radio signal may be transmitted to another device through each antenna. To this end, the signal generator 3360 may include an Inverse Fast Fourier Transform (IFFT) module, a Cyclic Prefix (CP) inserter, a Digital-to-Analog Converter (DAC), a frequency uplink converter, and the like A signal processing process for a receive signal in the wireless device may be configured in the reverse of the signal processing process (3310 to 3360) of FIG. 33. For example, the wireless device (e.g., 100 or 200 of FIG. 32) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource demapper process, a postcoding process, a demodulation process, and a de-scrambling process. The codeword may be reconstructed into an original information block via decoding. Accordingly, a signal processing circuit (not illustrated) for the receive signal may include a signal reconstructer, a resource demapper, a postcoder, a demodulator, a descrambler, and a decoder Wireless Device Example to which Present Disclosure is Applied FIG. 34 illustrates another example of a wireless device applied to the present disclosure. The wireless device may be implemented in various forms according to a use-case/service (refer to FIG. 34).

Referring to FIG. 34, wireless devices 3110 and 3120 may correspond to the wireless devices 3110 and 3120 of FIG. 31 and may be configured by various elements, components, units/portions, and/or modules. For example, each of the wireless devices 3110 and 3120 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 32. For example, the transceiver(s) 114 may include the one or more transceivers 106 and 106 and/or the one or more antennas 108 and 108 of FIG. 32. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (3110a of FIG. 31), the vehicles (3110b-1 and 3110b-2 of FIG. 31), the XR device (3110c of FIG. 31), the hand-held device (3110d of FIG. 31), the home appliance (3110e of FIG. 31), the IoT device (3110f of FIG. 31), a digital broadcast terminal, a hologram device, a public safety device, an MTC device, a medicine device, a fintech device (or a finance device), a security device, a climate/environment device, the AI server/device (400 of FIG. 31), the BSs (3120 of FIG. 31), a network node, etc. The wireless device may be used in a mobile or fixed place according to a use-example/service.

In FIG. 34, the entirety of the various elements, components, units/portions, and/or modules in the wireless devices 3110 and 3120 may be connected to each other through a wired interface or at least a part thereof may be wirelessly connected through the communication unit 110. For example, in each of the wireless devices 3110 and 3120, the control unit 120 and the communication unit 110 may be connected by wire and the control unit 120 and first units (e.g., 130 and 140) may be wirelessly connected through the communication unit 110. Each element, component, unit/portion, and/or module within the wireless devices 3110 and 3120 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Portable Device Example to which Present Disclosure is Applied

Figure 35:
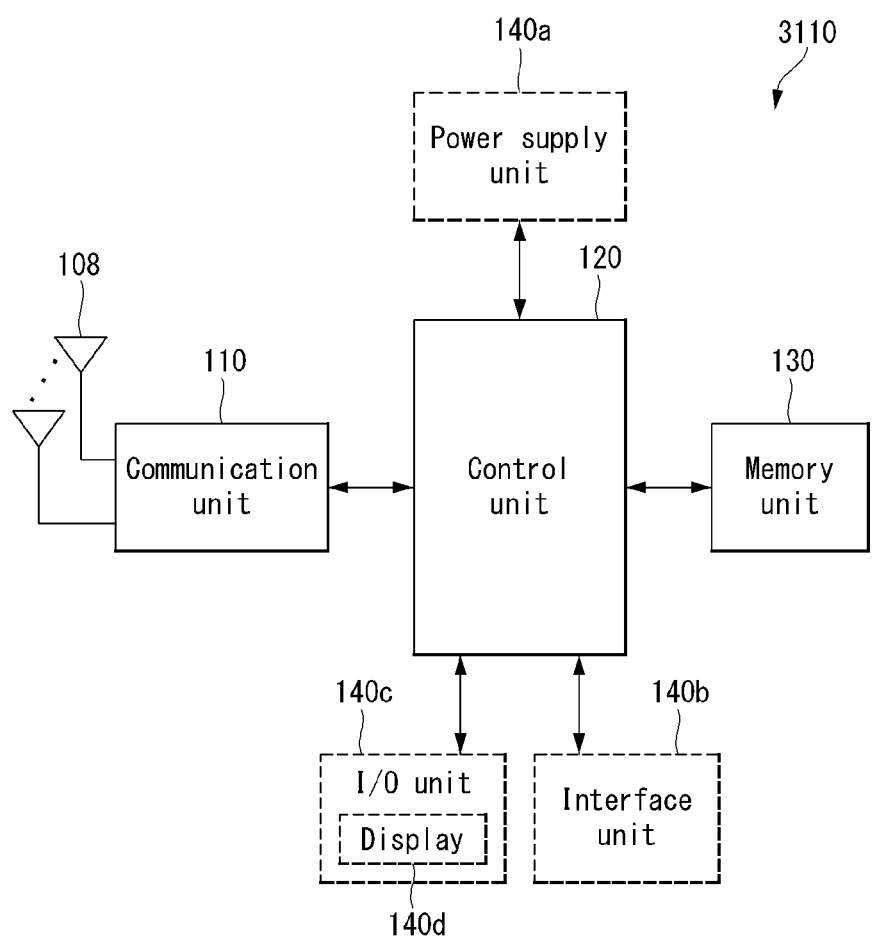
FIG. 35 illustrates a portable device applied to the present disclosure.

FIG. 35 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 35, a portable device 3110 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 31, respectively.

The communication unit 110 may transmit/receive a signal (e.g., data, a control signal, etc.) to/from another wireless device and eNBs. The control unit 120 may perform various operations by controlling components of the portable device 3110. The control unit 120 may include an Application Processor (AP). The memory unit 130 may store data/parameters/programs/codes/instructions required for driving the portable device 3110. Further, the memory unit 130 may store input/output data/information, etc. The power supply unit 140a may supply power to the portable device 3110 and include a wired/wireless charging circuit, a battery, and the like. The interface unit 140b may support a connection between the portable device 3110 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and can implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be driven by a processor. The memory is provided inside or outside the processor and can exchange data with the processor by various well-known means.

It is apparent to those skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

According to an embodiment of the present disclosure, the present disclosure can provide a method for transmitting and receiving data in a wireless communication system.

Furthermore, according to an embodiment of the present disclosure, data can be transmitted by using full transmission power configured by a base station when a terminal transmits uplink data to the base station.

Furthermore, according to an embodiment of the present disclosure, the base station acquires information associated with a capability of the terminal to configure a TPMI according to the capability of the terminal.

Effects obtainable from the present disclosure are not limited by the effects mentioned above, and other effects which are not mentioned above can be clearly understood from the following description by those skilled in the art to which the present disclosure pertains.

Although a scheme of transmitting and receiving data in a wireless communication system of the present disclosure has been described with reference to an example applied to a 3GPP LTE/LTE-A system or a 5G system (New RAT system), the scheme may be applied to various wireless communication systems in addition to the 3GPP LTE/LTE-A system or 5G system.

What is claimed is:

1. A method of receiving uplink data by a base station in a wireless communication system, the method comprising:
    receiving, from a user equipment (UE), capability information including (i) coherence capability and (ii) full power transmission capability;
    transmitting, to the UE, configuration information for configuring a codebook subset including at least one transmit precoding matrix indicator (TPMI) which is based on a codebook including TPMIs;
    transmitting, to the UE, downlink control information (DCI) (i) for scheduling the uplink data and (ii) including information for a TPMI for transmitting the uplink data; and
    receiving, from the UE, the uplink data based on (i) the codebook subset, (ii) the TPMI based on the DCI and (iii) a configured transmission power of the UE, and
    wherein the codebook subset is configured based on (i) the coherence capability and (ii) the full power transmission capability, and
    based on the full power transmission capability being information for the UE not supporting full power transmission with single port:
        wherein based on the coherence capability being information for non coherent, the codebook subset (i) is configured as a non coherent codebook subset and (ii) includes at least one fully coherent TPMI and/or at least one partially coherent TPMI for a rank 1, rank 2 and rank 3.

2. The method of claim 1, based on the full power transmission capability being the information for the UE not supporting the full power transmission with the single port:
    wherein the at least one fully coherent TPMI is for uplink transmission for the rank 1 using 2 or 4 ports, and
    wherein the at least one partially coherent TPMI is for uplink transmission for the rank 2 and the rank 3 using 4 ports.

3. The method of claim 2, based on the full power transmission capability being the information for the UE not supporting the full power transmission with the single port:
    wherein a scaling factor for determining the transmission power is defined as a ratio of a number of ports with non-zero transmission power over a maximum number of sounding reference signal (SRS) ports supported by the UE in one SRS resource for all the at least one TPMI included in the codebook subset.

4. The method of claim 3, based on the full power transmission capability being the information for the UE not supporting the full power transmission with the single port:
    wherein based on (i) the coherence capability being the information for the non coherent and (ii) the information for the TPMI included in the DCI being information for one of the at least one fully coherent TPMI, a value of the scaling factor is '1'.

5. The method of claim 3, based on the full power transmission capability being the information for the UE not supporting the full power transmission with the single port:
    wherein based on (i) the coherence capability being the information for the non coherent and (ii) the information for the TPMI included in the DCI being information for one of the at least one partially coherent TPMI, a value of the scaling factor is '1'.

6. The method of claim 1, based on the full power transmission capability being information for the UE supporting the full power transmission with the single port for some ports among all ports:
    wherein the full power transmission capability includes information on at least one specific TPMI which delivers full power.

7. The method of claim 6, based on the full power transmission capability being the information for the UE supporting the full power transmission with the single port for the some ports among the all ports:
    wherein a value of a scaling factor for determining the transmission power is '1' for the at least one specific TPMI which delivers full power reported by the UE, among the at least one TPMI included in the codebook subset, and
    wherein the scaling factor is defined as a ratio of a number of ports with non-zero transmission power over a number of SRS ports for remaining TPMIs other than the at least one specific TPMI which delivers full power, among the at least one TPMI included in the codebook subset.

8. The method of claim 7, based on the full power transmission capability being the information for the UE supporting the full power transmission with the single port for the some ports among the all ports:
    wherein the at least one specific TPMI which delivers the full power is based on a non coherent TPMI and/or a partial coherent TPMI.

9. The method of claim 8, based on the full power transmission capability being the information for the UE supporting the full power transmission with the single port for the some ports among the all ports:
    wherein based on the coherence capability being the information for the non coherent, the at least one specific TPMI which delivers the full power is based on the non coherent TPMI.

10. The method of claim 9, based on the full power transmission capability being the information for the UE supporting the full power transmission with the single port for the some ports among the all ports:
    wherein based on the coherence capability being information for partial coherent, the at least one specific TPMI which delivers the full power is based on the non coherent TPMI and the partial coherent TPMI, and
    wherein the partial coherent TPMI is for uplink transmission for the rank 1 using 4 ports.

11. The method of claim 1, based on the full power transmission capability being information for the UE supporting the full power transmission with the single port for all ports:
    wherein a value of a scaling factor for determining the transmission power is '1' for the at least one TPMI included in the codebook subset.

12. The method of claim 1, wherein the coherence capability includes one of (i) information for the non coherent, (ii) information for partial coherent and (iii) information full coherent.

13. A base station configured to receive uplink data in a wireless communication system, the base station comprising:
- one or more transceivers;
- one or more processors; and
- one or more memories connected to the one or more processors and storing instructions that, based on being executed by the one or more processors, perform operations that include:
- receiving, from a user equipment (UE), capability information including (i) coherence capability and (ii) full power transmission capability;
- transmitting, to the UE, configuration information for configuring a codebook subset including at least one transmit precoding matrix indicator (TPMI) which is based on a codebook including TPMIs;
- transmitting, to the UE, downlink control information (DCI) (i) for scheduling the uplink data and (ii) including information for a TPMI for transmitting the uplink data; and
- receiving, from the UE, the uplink data based on (i) the codebook subset, (ii) the TPMI based on the DCI and (iii) a configured transmission power of the UE, and
- wherein the codebook subset is configured based on (i) the coherence capability and (ii) the full power transmission capability, and
- based on the full power transmission capability being information for the UE not supporting full power transmission with single port:
  - wherein based on the coherence capability being information for non coherent, the codebook subset (i) is configured as a non coherent codebook subset and (ii) includes at least one fully coherent TPMI and/or at least one partially coherent TPMI for a rank 1, rank 2 and rank 3.

14. An apparatus comprising:
- at least one processor; and
- at least one memory functionally connected to the at least one processor;
- wherein the at least one processor configured to:
- transmit capability information including (i) coherence capability and (ii) full power transmission capability;
- receive configuration information for configuring a codebook subset including at least one transmit precoding matrix indicator (TPMI) which is a part of TPMIs included in a codebook;
- receive downlink control information (DCI) (i) for scheduling uplink data and (ii) including information for a TPMI for transmitting the uplink data;
- determine a transmission power for the uplink data; and
- transmit the uplink data based on (i) the codebook subset, (ii) the TPMI based on the DCI and (iii) the determined transmission power, and
- wherein the codebook subset is configured based on (i) the coherence capability and (ii) the full power transmission capability, and
- based on the full power transmission capability being information for not supporting full power transmission with single port:
  - wherein based on the coherence capability being information for non coherent, the codebook subset (i) is configured as a non coherent codebook subset and (ii) includes at least one fully coherent TPMI and/or at least one partially coherent TPMI for a rank 1, rank 2 and rank 3.

* * * * *